US010269208B2

(12) United States Patent
Lim et al.

(10) Patent No.: US 10,269,208 B2
(45) Date of Patent: Apr. 23, 2019

(54) METHOD AND SYSTEM FOR INCORPORATING CAPTURED LIVE EVENT DATA INTO VIRTUAL ENVIRONMENTS

(71) Applicant: Genting Intellectual Property Pte. Ltd., Singapore (SG)

(72) Inventors: Chee Heong Lim, Selangor Darul Ehsan (MY); Chee Keng Wong, Kuala Lumpur (MY); Yong Cheong H'Ng, Selangor (MY); Kheng Sin Teh, Selangor (MY); Way Loon Leong, Perak (MY)

(73) Assignee: Genting Intellectual Property Pte. Ltd., Singapore (SG)

( * ) Notice: Subject to any disclaimer, the term of this patent is extended or adjusted under 35 U.S.C. 154(b) by 271 days.

(21) Appl. No.: 15/463,931

(22) Filed: Mar. 20, 2017

(65) Prior Publication Data

US 2017/0193742 A1   Jul. 6, 2017

Related U.S. Application Data

(63) Continuation of application No. PCT/SG2015/050276, filed on Aug. 25, 2015.

(30) Foreign Application Priority Data

Sep. 19, 2014   (SG) .......................... 10201405911V

(51) Int. Cl.
*G07F 17/32*   (2006.01)
*A63F 13/31*   (2014.01)
(Continued)

(52) U.S. Cl.
CPC ........ *G07F 17/3225* (2013.01); *A63F 13/213* (2014.09); *A63F 13/31* (2014.09);
(Continued)

(58) Field of Classification Search
USPC .......................................... 463/31
See application file for complete search history.

(56) References Cited

U.S. PATENT DOCUMENTS

| 5,800,268 A | 9/1998 | Molnick |
| 6,508,709 B1 | 1/2003 | Karmarkar |

(Continued)

OTHER PUBLICATIONS

Written Opinion of the International Searching Authority dated Oct. 30, 2015 in corresponding PCT application PCT/SG2015/050276.

(Continued)

*Primary Examiner* — Pierre E Elisca
(74) *Attorney, Agent, or Firm* — Knobbe Martens Olson & Bear LLP

(57) ABSTRACT

Methods and systems for incorporating captured live event data into one or more virtual environments are described. For instance, a system can include a plurality of digital video capturing devices configured to capture real-time events that occur during a plurality of live events in respective live environments to generate real-time multimedia data. A computing system can receive the real-time multimedia data, generate virtual multimedia data, and incorporate the real-time multimedia data and the virtual multimedia data to generate hybrid multimedia data for a plurality of hybrid events in respective hybrid environments such that the hybrid events occur substantially simultaneously with the real-time events. A user interface is displayed on a mobile electronic device which presents the hybrid environments.

21 Claims, 16 Drawing Sheets

(51) Int. Cl.
    *A63F 13/65*     (2014.01)
    *A63F 13/213*     (2014.01)
    *A63F 13/42*     (2014.01)

(52) U.S. Cl.
    CPC .............. *A63F 13/42* (2014.09); *A63F 13/65* (2014.09); *G07F 17/322* (2013.01); *G07F 17/3211* (2013.01); *G07F 17/3218* (2013.01); *G07F 17/3223* (2013.01); *G07F 17/3276* (2013.01); *G07F 17/3293* (2013.01)

(56) References Cited

U.S. PATENT DOCUMENTS

| | | |
|---|---|---|
| 6,575,834 B1 | 6/2003 | Lindo |
| 2012/0004036 A1 | 1/2012 | Hill |
| 2014/0123014 A1* | 5/2014 | Keen .................... H04L 51/046 715/719 |

OTHER PUBLICATIONS

International Search Report dated Oct. 30, 2015 in corresponding PCT application PCT/SG2015/050276.

* cited by examiner

US 10,269,208 B2

METHOD AND SYSTEM FOR INCORPORATING CAPTURED LIVE EVENT DATA INTO VIRTUAL ENVIRONMENTS

CROSS-REFERENCE TO RELATED APPLICATIONS

This application is a continuation application of, and claims the benefit under 35 U.S.C. §§ 120 and 365 of, PCT Application No. PCT/SG2015/050276, filed on Aug. 25, 2015, which is hereby incorporated by reference. PCT/SG2015/050276 also claims priority to Singaporean Patent Application No. 10201405911V filed on Sep. 19, 2014, which is hereby incorporated by reference.

BACKGROUND

Technical Field

The described technology generally relates to a method and system for processing live and virtual multimedia data.

Description of the Related Technology

Real-time data for live event environments are often captured by an image capturing device such as a digital camera. The image capturing device typically displays the captured data substantially in real-time as the live events or environments. Other systems exist that are capable of generating and displaying virtual data corresponding to virtual environments.

SUMMARY

According to an aspect of the disclosure a system is provided for incorporating captured live event data in one or more virtual environments. The system can include a plurality of digital video capturing devices configured to capture real-time events that occur during a plurality of live events in respective live environments to generate real-time multimedia data. The system can further include a computing system comprising one or more computing devices including a streaming server in communication with the digital video capturing devices. The streaming server can be configured to receive the real-time multimedia data from the digital video capturing devices. The computing system can be configured to generate virtual multimedia data containing a plurality of virtual environments respectively corresponding to the live environments. The computing system can also be configured to incorporate the real-time multimedia data and the virtual multimedia data to generate hybrid multimedia data for a plurality of hybrid events in respective hybrid environments such that the hybrid events occur substantially simultaneously with the real-time events. The computing system can also be configured to transmit the generated hybrid multimedia data to a mobile electronic device. In addition, the computing system can be configured to provide a user interface to be displayed on the mobile electronic device. The user interface can present the hybrid environments. The user interface further can include an incident notifier configured to trigger a notification when a pre-determined trend of results of at least one of the hybrid games occurs.

Another aspect is a method and system for providing customizable alerts on game trends.

Another aspect is a system for processing multimedia data. The system can include a plurality of tracking devices configured to capture real-time events that occur during a plurality of live games played in respective live environments to generate real-time multimedia data, and a computer system in communication with the tracking devices. The tracking devices can include a digital image capturing device, a digital video capturing device, a card tracker configured to detect an identity of a playing card that is being dealt, and/or a roulette wheel sensor configured to detect a result of a roulette wheel spin. The real-time events can include dealing of the playing card, the identity of the playing card, spinning of a roulette wheel, and/or the result of the roulette wheel spin. The computer system can receive the real-time multimedia data from the tracking devices, generate virtual multimedia data containing a plurality of virtual environments respectively corresponding to the live environments and combine the real-time multimedia data and the virtual multimedia data to generate hybrid multimedia data for a plurality of hybrid games containing hybrid events in hybrid environments such that the hybrid events occur substantially simultaneously with the real-time events. The computer system can also transmit the generated hybrid multimedia data to an electronic device, and control the electronic device to display a user interface for playing the hybrid games, the user interface including the hybrid environments. The user interface can include an incident notifier configured to trigger a notification when a pre-determined trend of results of at least one of the hybrid games occurs.

BRIEF DESCRIPTION OF THE DRAWINGS

Embodiments will be better understood and readily apparent to one of ordinary skill in the art from the following written description, by way of example only, and in conjunction with the drawings.

DETAILED DESCRIPTION

Figure 1:
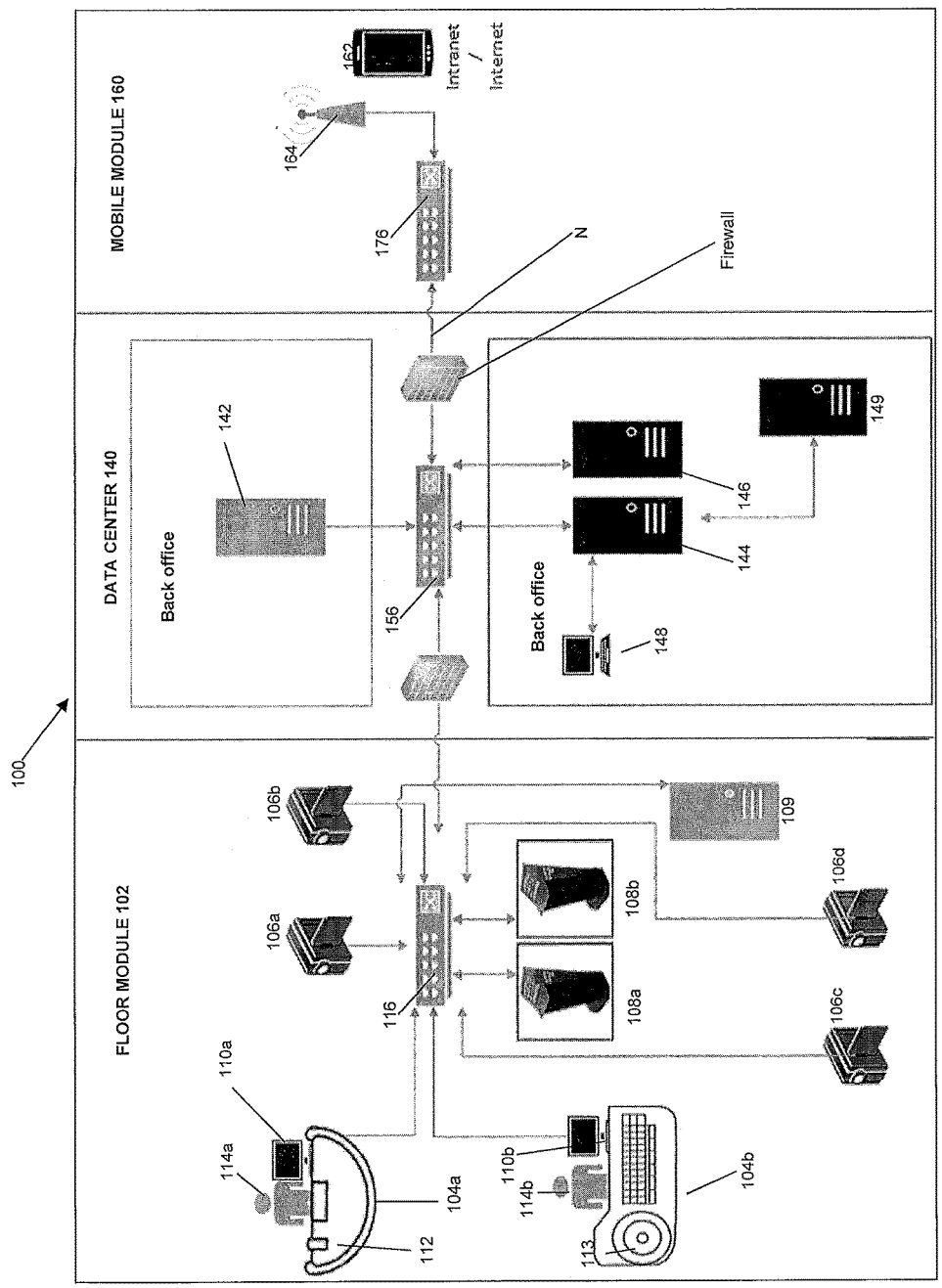
FIG. 1 is a schematic of a hybrid gaming system, according to an embodiment.

According to certain inventive aspects methods and systems are provided that address at least one of the problems described herein.

According to another aspect a system is provided for incorporating captured live event data in one or more virtual environments.

The system can include a plurality of digital video capturing devices configured to capture real-time events that occur during a plurality of live events in respective live environments to generate real-time multimedia data.

The system can further include a computing system comprising one or more computing devices including a streaming server in communication with the digital video capturing devices. The streaming server can be configured to receive the real-time multimedia data from the digital video capturing devices. The computing system can be configured to generate virtual multimedia data containing a plurality of virtual environments respectively corresponding to the live environments. The computing system can also be configured to incorporate the real-time multimedia data and the virtual multimedia data to generate hybrid multimedia data for a plurality of hybrid events in respective hybrid environments such that the hybrid events occur substantially simultaneously with the real-time events.

The computing system can also be configured to transmit the generated hybrid multimedia data to a mobile electronic device.

In addition, the computing system can be configured to provide a user interface to be displayed on the mobile electronic device. The user interface can present the hybrid environments.

The user interface further can include an incident notifier configured to trigger a notification when a pre-determined trend of results of at least one of the hybrid games occurs.

According to another aspect of the invention, there is provided a system for hybrid gaming, comprising a tracking device configured to capture events that occur during a live game, the live game being played in a live environment and a computer system in communication with the tracking device. In some embodiments, the computer system receives the captured events from the tracking device and provides a virtual environment comprising one or more aspects corresponding to the live environment. The computer system may also incorporate the captured events into the virtual environment to provide a hybrid environment for a hybrid game, wherein the incorporated events in the hybrid environment occur substantially in real-time as the events that occur during the live game. The computer system may further transmit data associated with the hybrid environment to an electronic device for playing the hybrid game, the electronic device in communication with the computer system.

The tracking device may comprise a digital image capturing device, a digital video capturing device, a card tracker for detecting an identity of a playing card that is being dealt, or a roulette wheel sensor for detecting a result of a roulette wheel spin.

The events that occur during the live game may comprise one or more of: dealing of the playing card, the identity of the playing card, spinning of a roulette wheel, and/or the result of the roulette wheel spin.

The aspects may comprise one or more of: at least a portion of a baccarat or roulette game table, wager(s) placed by a user of the electronic device, and/or remaining credit belonging to the user of the electronic device.

The electronic device may comprise a mobile electronic device; or an electronic table game console.

The computer system may comprise a streaming server configured to receive the captured events from the tracking device and a game and database server configured to: provide the virtual environment, incorporate the captured events received from the streaming server into the virtual environment to provide the hybrid environment and transmit data associated with the hybrid environment to the electronic device.

The game and database server may be further configured to create an Intranet-enabled virtual environment.

The computer system may be further configured to provide a user interface to be displayed on the electronic device for playing the hybrid game, the user interface comprising the hybrid environment.

The user interface may comprise an incident notifier, the incident notifier may be configured to be trigger a notification when a pre-determined incident occurs. The pre-determined incident may comprise a pre-determined trend of results of the hybrid game.

The user interface may comprise an image of a virtual playing card, and a viewing angle of the virtual card may be capable of being varied to provide progressive revealing of the identity of the virtual playing card.

The user interface may comprise an enlarged display of any one of the events that occur during the live game.

The system may further comprise: a plurality of tracking devices configured to capture events that occur during a plurality of live games, the live games being played in respective live environments, wherein the computer system is in communication with the plurality of tracking devices. In some embodiments, the computer system receives the captured events from the tracking devices and provides a plurality of virtual environments, each virtual environment comprising one or more aspects corresponding to each live environment. The computer system may also incorporate the captured events into the virtual environments to provide a plurality of hybrid environments for a plurality of hybrid games, wherein the incorporated events in the hybrid games occur substantially in real-time as the events that occur during the live games. The computer system may further transmit data associated with the hybrid environments to the electronic device for playing the hybrid games.

The user interface may be capable of concurrently accepting a plurality of user inputs for one or more of the hybrid environments. The plurality of user inputs may comprise wagers of one or more denominations.

According to a second aspect of the invention, there is provided a method of hybrid gaming, comprising capturing events that occur during a plurality of live games, the live games being played in respective live environments. The method may include providing a plurality of virtual environments, each virtual environment comprising one or more aspects corresponding to each live environment. The method may also include incorporating the captured events into the virtual environments to provide a plurality of hybrid environments for a plurality of hybrid games, wherein the incorporated events in the hybrid games occur substantially in real-time as the events that occur during the live games. The method may further include providing a user interface to be displayed on an electronic device for playing the hybrid game, the user interface comprising the hybrid environments.

The method may further comprise the step of configuring the user interface to concurrently accept a plurality of user inputs for one or more of the hybrid environments.

According to another aspect of the invention, there is provided an electronic device comprising a display screen, at least one processor, and at least one memory including computer program code. The at least one memory and the computer program code may be configured to, with the at least one processor, cause the device at least to: display a user interface on the display screen. The user interface may include a plurality of hybrid environments for an equal plurality of hybrid games, each hybrid environment comprising a virtual environment with events that occur in a live environment incorporated therein. The incorporated events in the hybrid environment may occur substantially in real-time as the events that occur in the live environment. The at least one memory and the computer program code may further cause the device to concurrently accept a plurality of user inputs for one or more of the hybrid environments.

Definitions

Virtual game: A game that is wholly played in a virtual environment, using an electronic device such as a personal computer, tablet computer, smart-phone, etc. The electronic device may provide a user interface that allows a player to interact with the virtual environment. For example, in a virtual roulette game, the virtual environment may include a virtual roulette wheel and virtual dealers/players interacting in a virtual casino. The gameplay is processed by the electronic device.

Live game: A game that is wholly played in a physical real-life environment. That is, the player is physically present in the environment. For example, in a live roulette game, the physical real-life environment may include a real roulette wheel and real dealers/players interacting in the physical real-life environment. In this case, the gameplay is typically facilitated by the dealer.

Hybrid game: A game that involves aspects of both a virtual and live game. That is, the hybrid game comprises gameplay that is conducted in both a virtual environment and a physical real-life environment. The virtual environment and physical real-life environment co-exist substantially simultaneously such that events that occur in the virtual environment can be experienced in the physical real-life environment at the same time, and vice versa. For example, a hybrid game may have a corresponding hybrid environment, the hybrid environment comprising a virtual environment with events that occur in a live game incorporated therein. The incorporated events in the hybrid environment occur substantially in real-time as the events that occur in the live game.

Mobile player: A player that is playing a virtual game. As the virtual game is expected to be played using an electronic device, the mobile player can play the virtual game without being physically present in the physical real-life environment (e.g., not physically present at the baccarat game table).

Live player: A player that is playing a live game. The player is expected to be physically present in the physical real-life environment (e.g., physically present at the baccarat game table).

Trend (of game results): A series of game results/outcomes which may show the 'biasness' of any trackable game. For example, the outcomes in casino games such as series of Banker/Player outcome in a Baccarat game; series of 'Blackjacks' and 'Busts' of the House in a Blackjack game; and winning numbers/winning sectors in a roulette game. Such outcomes may provide meaningful statistical information to the players to help them make decisions on their next bet.

Currently, casinos have physical game tables, slot machines and other gaming platforms so that live players (who are physically present at the casino) can participate in the live game. Some casinos may also have electronic game consoles located at the casino floor, which allow live players to participate in virtual versions of games (e.g., video slot machines, etc.).

However, playing games using these electronic game consoles may lack realism as all aspects of gameplay are virtual (e.g., virtual dealer, computer-generated game results, virtual cards, roulette wheel, etc.).

Also, live players who wish to participate in live games may be unable to do so if the physical game tables or slot machines are fully occupied by other live players. In such an event, if these live players wish to play any games, they would have to participate in the virtual game instead using the electronic game consoles. However, as mentioned above, playing games using the electronic game consoles may lack realism. Further, live players are physically restricted in a conventional casino from betting on multiple games located at different physical sites within a casino or even in affiliated casinos located elsewhere, and they lack the facility to monitor the trend of game outcomes (e.g., banker/player outcome in a baccarat game; or incidences of "blackjack"/"bust" by the House in a blackjack game; or roulette sector results in a roulette game) at different physical locations within a casino as well as in remotely located casinos. Players generally believe that if their bets are based on statistical analysis of game results (e.g., trends), they may have a higher chance of winning.

Embodiments will be described, by way of example only, with reference to the drawings. Like reference numerals and characters in the drawings refer to like elements or equivalents.

In the following description, two well-known games (baccarat and roulette) are used to facilitate the description of embodiments. However, it will be appreciated by a person skilled in the art that the described technology is not restricted to only baccarat and roulette and can be applicable to other games such as blackjack and Sicbo. Moreover, the described technology is not restricted to casino-type games, and can equally apply to games that may not involve wagering/betting (e.g., solitaire, chess, hearts, contract bridge).

Hybrid System

FIG. 1 is a schematic of a hybrid gaming system 100, according to an embodiment. The system 100 comprises three modules: a floor module 102, such as a casino floor module 102, a data center 140 and a mobile module 160, such as a mobile gaming module 160.

For conciseness, the following description may only refer to a single module/component, e.g., one game table, one server, one card tracker, etc. However, it is to be understood that the system(s) described herein can be adapted to accommodate multiple modules/components (e.g., multiple game tables, servers, and card trackers).

The casino floor module 102 comprises components that are physically located at the premises of a casino or gaming facility. The components include physical game tables 104a/104b, cameras 106a/106b/106c/106d, electronic table game (ETG) consoles 108a/108b and pit server 109. The pit server 109 is connected to network N and configured to act as a relay server for dealer consoles 110a/110b, ETG consoles 108a/108b and game & database server 144.

Physical game table 104a may be a baccarat game table and comprise a dealer console 110a and a card tracker 112 (e.g., "Angel Eye®" from Angel Playing Cards Co., Ltd.). The card tracker 112 is a card shoe having a card scanner that is able to track the cards that have been dealt (i.e., brought into the game) by the dealer 114a. The card tracker 112 and a game & database server 144 are connected to network N via hubs 116 and 156, respectively. The card tracking information (e.g., which cards have been dealt, and when they were dealt) can be sent to the game & database server 144. The dealer console 110a allows the dealer 114a to facilitate the playing of the game. The dealer console 110a may provide general functions for the dealer and/or advanced functions for the supervisor. General functions include, but are not limited to: (i) starting a new game, (ii) confirming a game result, (iii) performing a "last call" command (5 seconds countdown), (iv) performing a "no more bets" command, and (iv) pausing a game. Advanced functions include, but are not limited to: (i) voiding a game, and (ii) recalling a game. The dealer console 110a is connected to network N via hub 116 for communication with pit server 109 so that information between the dealer console 110a and the game & database server 144 can be exchanged. Cameras 106a/106b are installed at appropriate locations to capture video and/or still images of the game that is being played at the physical game table 104a. Cameras 106a/106b are connected to network N via hub 116 for communication with the streaming server 146 so that the captured videos and/or still images can be sent to the mobile devices 162 and electronic table game (ETG) consoles 108a/108b.

Physical game table 104b may be a roulette game table and further comprise a dealer console 110b and a roulette sensor 113 (e.g., roulette sensor from TCSJOHNHUX-LEY™). The roulette sensor is fitted onto a roulette wheel and is able to track the winning numbers/colors. The roulette sensor 113 and game & database server 144 are connected to network N via hubs 116 and 156, respectively. The roulette sensor information (e.g., what are the winning numbers/colors, and when they were won) can be sent to the game & database server 144. The dealer console 110b has similar functionalities as the dealer console 110a described above. The dealer console 110b is connected to network N via hub 116 for communication with pit server 109 so that information between the dealer console 110b and the game & database server 144 can be exchanged. Cameras 106c/106d are installed at appropriate locations to capture video and/or still images of the game that is being played at the physical game table 104b. Cameras 106c/106d are connected to network N via hub 116 for communication with streaming server 146 so that the captured videos and/or still images can be sent to mobile devices 162 and electronic table game (ETG) consoles 108a/108b.

The cameras 106a/106b/106c/106d (which may be digital image capturing devices or digital video capturing devices), card tracker 112 and roulette wheel sensor 113 may be collectively referred to as tracking devices. These tracking devices are configured to capture events that occur during a live game (as defined above).

ETG consoles 108a/108b are connected to pit server 109 and network N via hub 116 for communication with game & database server 144. The ETG consoles 108a/108b allow players who are not physically present at the physical game tables 104a/104b but who are within the casino premises to participate, in real-time, in games that are being played at the physical game tables 104a/104b. The ETG consoles 108a/108b may have display screens and input modules (e.g., keypads) or integrated input/output modules (e.g., touchscreens) capable of displaying user interfaces that allow players to participate, in real-time, in games that are being played at the physical game tables 104a/104b. Relevant information (e.g., cards being dealt (in the case of baccarat), the winning numbers/colors (in the case of roulette), the dealer's moves, other mobile or live players' moves and bets) received from the relevant tracking devices (e.g., card tracker 112, roulette sensor 113, cameras 106a/106b/106c/106d, etc.) are displayed through the ETG console user interfaces.

The data center 140 comprises components that may be physically located at the premises of a casino or gaming facility (e.g., at the back office), or located offsite (i.e., remote from the casino or gaming facility). The components include a legacy casino system (DRS) 142, a game & database server 144, a streaming server 146, an administrator console 148 and a payment processor server 149. The data center 140 provides back-end game processing and payment integration to allow processing of bets/winnings and debiting/crediting of players' accounts to facilitate the simultaneous betting in different games being played at different locations within the casino and/or in remote affiliated casinos and/or online (Internet) casinos.

Use of the term 'server' herein may be understood to mean a single computing device or a plurality of interconnected computing devices which operate together to perform a particular function. That is, the server may be contained within a single hardware unit or be distributed among several or many different hardware units. An exemplary computing device which may be operated as a server is described below with reference to FIG. 2 below.

The legacy casino system (DRS) 142 is typically a proprietary reporting system that puts data into perspective, giving casino management an elevated dimension for decision making. The DRS 142 may include the following sub-systems/modules: (i) table game module, (ii) slot module, (iii) treasury module, (iv) casino membership module, and (v) backend report module.

The streaming server 146 (e.g., WOWZA® streaming server) is used for streaming of live and on-demand video, audio, and RIAs (rich Internet applications) over IP networks to desktop, laptop, and tablet computers, mobile devices, IPTV set-top boxes, internet-connected TV sets, and other network-connected devices such as the ETG consoles 108a/108b and mobile electronic device 162. The streaming server 146 can stream to multiple types of playback clients and devices (e.g., mobile electronic device 162) simultaneously, including Adobe Flash player, Microsoft Silverlight player, Apple QuickTime Player and iOS devices (iPad, iPhone, iPod Touch), 3GPP mobile phones (Android, BlackBerry OS, Symbian, etc.), IPTV set-top boxes, and game consoles such as Nintendo Wii, Sony PS3 and ETG consoles 108a/108b.

The streaming server 146 is connected to network N via hub 156 in order to stream content to ETG consoles 108a/108b and/or mobile electronic device 162. Video data captured by the cameras 106a/106b/106c/106d are sent to the streaming server 146.

The game & database server 144, which is connected to network N, can receive, at least: (i) card tracking information from the card tracker 112, and (ii) roulette sensor information from the roulette sensor 113. The game & database server 144 can also receive and send data to/from the pit server 109. The game & database server 144 is configured to process and record bet information, game mode (e.g., live, mechanical or random number generator), game results, win allocation and mobile player information. The game & database server 144 is also configured to execute the hybrid gameplay and control the user interface (e.g., send and receive data to/from the ETG consoles 108a/108b and/or mobile electronic device 162 to control the user interface). The game & database server 144 may be further configured to collate trend results of selected games which are simultaneously broadcasted to the ETG consoles 108a/108b and/or mobile electronic device 162 together with the video data captured by the cameras. The game & database server 144 may also be in communication with a wide-area progressive jackpot module which manages wide-area progressive jackpots.

In a further implementation, mobile applications ("apps") may be provided for downloading onto the mobile device 162 and/or ETG consoles 108a/108b to allow mobile players to select which game(s) are to be played simultaneously, and which game events/results are to be displayed on the mobile device 162 and/or ETG consoles 108a/108b. As the mobile device 162 and/or ETG consoles 108a/108b may have a relatively small display screen size, there may be provided a user interface with multiple layers of displays/windows.

The administrator console 148 provides an interface for users (e.g., casino operators and gaming administrators) to access the various functions of the game & database server 144. The administrator console 148 may include the following modules: (i) user module, (ii) customer module, (iii) game table module, (iv) cashier module, and (v) configuration module as well as (vi) a wide-area progressive jackpot management module. The user module may provide functions such as account maintenance and access group maintenance. The customer module may provide functions such as card type maintenance and card group maintenance. The game table module may provide functions such as game table maintenance, gaming area maintenance and gaming division maintenance. The cashier module may provide functions such as cashier commodity maintenance, cashier location maintenance and cage terminal maintenance. The configuration module may provide functions such as features maintenance, setting of parameters and reporting. The wide-area progressive jackpot management module manages the contribution to the progressive jackpots which may include few different jackpot amounts and monitors the outcome of games which may be located in a number of different remotely located physical casinos as well as associated jackpot games in online (internet) casinos.

The game & database server 144, the streaming server 146, and the progressive game server/module may make up a computer system. The computer system, as a whole, may be configured to: receive the captured events from the tracking device(s) and provide a virtual environment comprising one or more aspects corresponding to the live environment. The computer system may also incorporate the captured events into the virtual environment to provide a hybrid environment for a hybrid game, wherein the incorporated events in the hybrid environment occur substantially in real-time as the events that occur during the live game; and transmit data associated with the hybrid environment to an electronic device (e.g., ETG consoles 108a/108b or mobile electronic device 162) for playing the hybrid game. In this context, the events that occur during the live game may include one or more of: dealing a playing card, the identity of the playing card, spinning a roulette wheel and the result of the roulette wheel spin. The aspects may comprise one or more of: at least a portion of a baccarat or roulette game table, wager(s) placed by a user of the electronic device and remaining credit belonging to the user.

Payment processor server 149 is configured to handle all payment requests. For example, a player could use the ETG consoles 108a/108b to perform reloading/top-up of credit in their account. In an implementation, players can insert their credit/debit cards into a card reader located at the ETG consoles, or 'tap' their contactless payment instruments (e.g., contactless payment credit cards) on contactless readers (e.g., near field communication (NFC) readers) located at the ETG consoles. In a further implementation, intranet-based mobile players may use their NFC enabled smart-phones to reload/top-up credit in their account at an ETG console with a NFC reader without having to go to a cashier. Internet-based mobile players may reload/top-up credit in their account through payment processor server 149.

Figure 2:
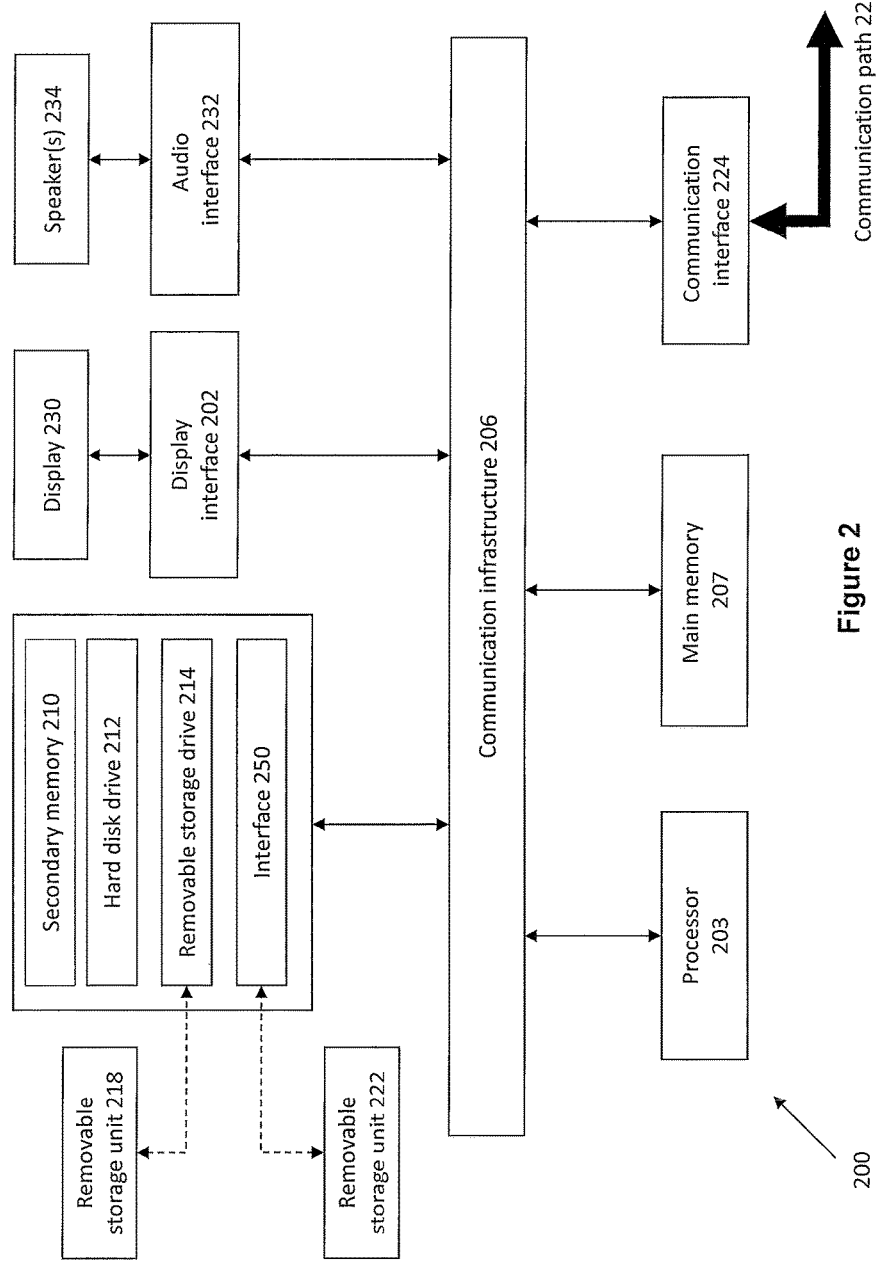
FIG. 2 shows an exemplary computing device to realize a server for the game & database server, streaming server and/or legacy casino system (DRS) shown in FIG. 1.

FIG. 2 shows an exemplary computing device to realize a server for the game & database server 144, streaming server 146 and/or legacy casino system (DRS) 142 shown in FIG. 1.

The following description of the computing device 200 is provided by way of example only and is not intended to be limiting. Therefore, one or more elements/components of the computing device 200 may be omitted. Also, one or more elements/components of the computing device 200 may be combined together. Additionally, one or more elements/components of the computing device 200 may be split into one or more component parts.

With reference to FIG. 2, the exemplary computing device 200 includes a processor 203 for executing software routines. Although a single processor is shown for the sake of clarity, the computing device 200 may also include a multi-processor system. The processor 203 is connected to a communication infrastructure 206 for communication with other components of the computing device 200. The communication infrastructure 206 may include, for example, a communications bus, cross-bar, or network.

The computing device 200 further includes a main memory 207, such as a random access memory (RAM), and a secondary memory 210. The secondary memory 210 may include, for example, a hard disk drive 212 and/or a removable storage drive 214, which may include a magnetic tape drive, an optical disk drive, or the like. The removable storage drive 214 reads from and/or writes to a removable storage unit 218 in a well-known manner. The removable storage unit 218 may include a magnetic disk, optical disk, or the like, which is read by and written to by removable storage drive 214. As will be appreciated by persons skilled in the relevant art(s), the removable storage unit 218 includes a computer readable storage medium having stored therein computer executable program code instructions and/or data.

In an alternative implementation, the secondary memory 210 may additionally or alternatively include other similar elements configured to allow computer programs or other instructions to be loaded into the computing device 200. Such elements can include, for example, a removable storage unit 222 and an interface 250. Examples of a removable storage unit 222 and interface 250 include a program cartridge and cartridge interface, a removable memory chip (such as an EPROM or PROM) and associated socket, and other removable storage units 222 and interfaces 250 which allow software and data to be transferred from the removable storage unit 222 to the computing device 200.

The computing device 200 also includes at least one communication interface 224. The communication interface 224 allows software and data to be transferred between computing device 200 and external devices via a communication path 226. In various implementations, the communication interface 224 permits data to be transferred between the computing device 200 and a data communication network, such as a public data or private data communication network. The communication interface 224 may be used to exchange data between different computing devices 200 which such computing devices 200 form part an interconnected computer network. Examples of a communication interface 224 can include a modem, a network interface (such as an Ethernet card), a communication port, an antenna with associated circuitry and the like. The communication interface 224 may be wired or may be wireless. Software and data transferred via the communication interface 224 are in the form of signals which can be electronic, electromagnetic, optical or other signals that can be received by communication interface 224. These signals are provided to the communication interface via the communication path 226.

As shown in FIG. 2, the computing device 200 further includes a display interface 202 which performs operations for rendering images to an associated display 230 and an audio interface 232 for performing operations for playing audio content via associated speaker(s) 234.

As used herein, the term "computer program product" may refer, in part, to removable storage unit 218, removable storage unit 222, a hard disk installed in hard disk drive 212, or a carrier wave carrying software over communication path 226 (wireless link or cable) to communication interface 224. A computer readable medium can include magnetic media, optical media, or other recordable media, or media that transmits a carrier wave or other signal. These computer program products are devices for providing software to the computing device 200. Computer readable storage medium refers to any non-transitory tangible storage medium that provides recorded instructions and/or data to the computing device 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computing device 200. Examples of transitory or non-tangible computer readable transmission media that may also participate in the provision of software, application programs, instructions and/or data to the computing device 200 include radio or infra-red transmission channels as well as a network connection to another computer or networked device, and the Internet or Intranets including e-mail transmissions and information recorded on Websites and the like.

The computer programs (also called computer program code) are stored in main memory 207 and/or secondary memory 210. Computer programs can also be received via the communication interface 224. Such computer programs, when executed, enable the computing device 200 to perform one or more steps that facilitate the implementation of a hybrid gaming system. The computer programs, when executed, enable the processor 203 to facilitate implementation of a hybrid gaming system. Accordingly, such computer programs may represent controllers of the computing device 200.

Software may be stored in a computer program product and loaded into the computing device 200 using the removable storage drive 214, the hard disk drive 212, or the interface 250. Alternatively, the computer program product may be downloaded to the computing device 200 over the communications path 226. The software, when executed by the processor 203, causes the computing device 200 to perform the necessary operations to execute one or more steps that facilitate the implementation of a hybrid gaming system.

Turning back to FIG. 1, the mobile gaming module 160 comprises mobile electronic device 162 and antenna 164. As mentioned above, for conciseness, the following description may only refer to a single mobile electronic device or antenna. However, it is to be understood that the system(s) described herein can be adapted to accommodate multiple mobile electronic devices or antennae.

The mobile electronic device 162 is in communication with antenna 164 for wireless connection to network N. Details of the wireless connection are known and not within the scope of the described technology, and therefore will not be elaborated further. Here, the network N may be the casino's local area network (LAN).

In one implementation, the mobile electronic device 162 may be connected to the LAN via WIFI. The user of the mobile electronic device 162 is expected to be within the casino's premises in order to participate in the hybrid game. LAN authentication for the mobile electronic device 162 may be tied to Service Set Identifiers (SSIDs) that are configured for various access points. Downloadable mobile applications may be made available for the mobile devices to provide an interface for mobile players to select multiple games to be displayed in a customizable/intelligent manner on their mobile device screens, as well as the real-time display of respective trend results.

In another implementation, the mobile electronic device 162 is connected to the LAN via an Internet connection. The user of the mobile electronic device 162 may not be within the casino's premises when participating in the hybrid game. For example, the user can be at home and still participate in the hybrid game. In this implementation, the game & database server 144 may be configured to allow 'external' connections so that mobile electronic devices can be connected to the LAN via an Internet connection/WIFI. For example, the game & database server 144 may be configured to create an Intranet-enabled virtual environment. Downloadable mobile applications may be made available for the mobile devices to provide an interface for mobile players to select multiple games to be displayed in a customizable/intelligent manner on their mobile device screens, as well as the real-time display of respective trend results.

An exemplary computing device which may be realized as the mobile electronic device 162 is described below with reference to FIG. 3 below.

Figure 3:
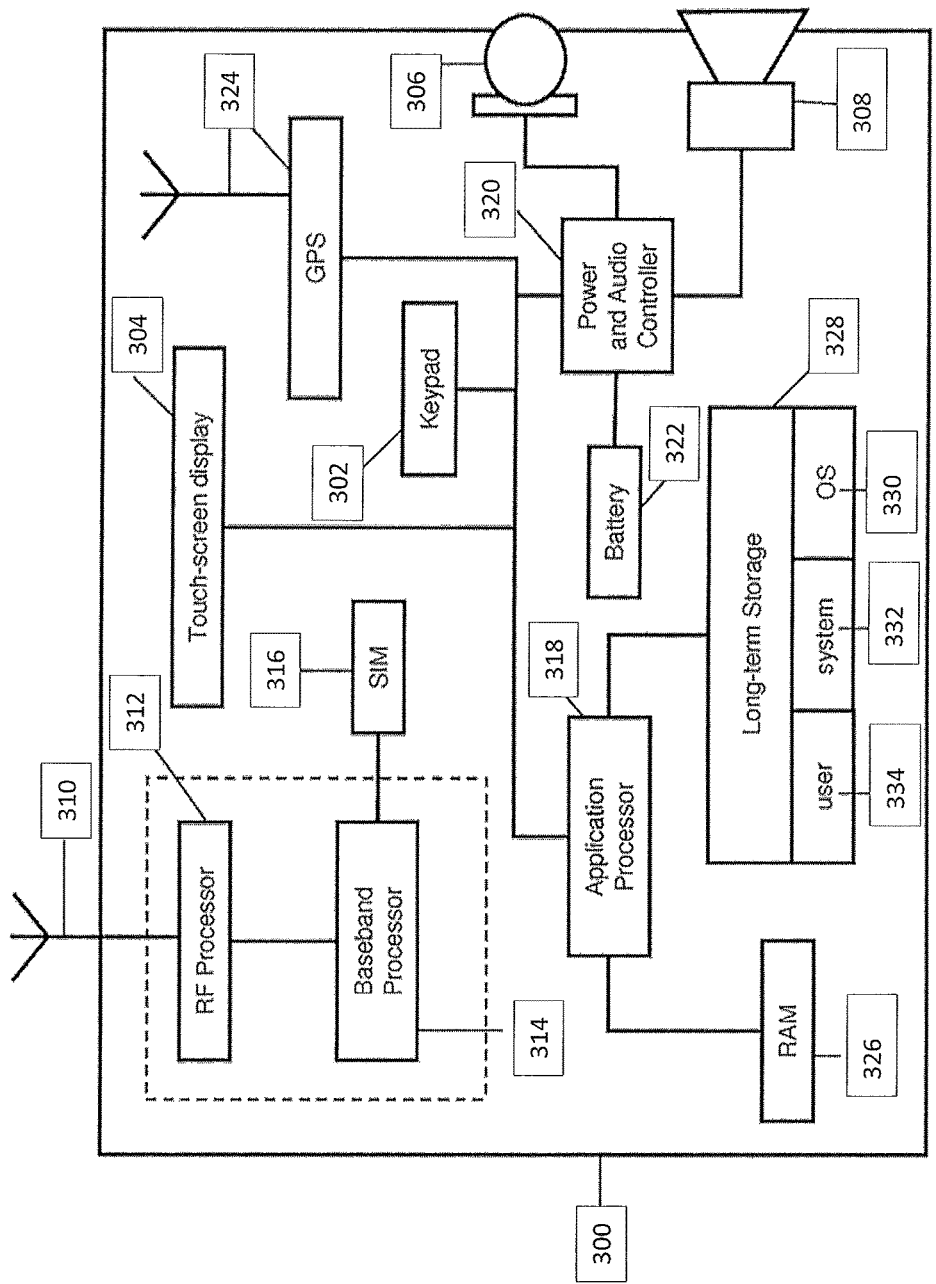
FIG. 3 is a schematic of an exemplary wireless computing device that may be utilized to implement the mobile electronic device shown in FIG. 1.

FIG. 3 is a schematic of an exemplary wireless computing device 300 that may be utilized to implement the mobile electronic device 162 shown in FIG. 1. The wireless device 300 comprises a keypad 302, a touch-screen 304, a microphone 306, a speaker 308 and an antenna 310. The wireless device 300 can be operated by a user to perform a variety of different functions, such as, for example, hosting a telephone call, sending an SMS message, browsing the Internet, sending an email and providing satellite navigation.

The wireless device 300 comprises hardware to perform communication functions (e.g., telephony, data communication), together with an application processor and corresponding support hardware to enable the wireless device 300 to have other functions, such as, messaging, Internet browsing, email functions and the like. The communication hardware is represented by the RF processor 312 which provides an RF signal to the antenna 310 for the transmission of data signals, and the receipt therefrom. Additionally provided is a baseband processor 314, which provides signals to and receives signals from the RF Processor 312. The baseband processor 314 also interacts with a subscriber identity module 316, as is well known in the art. The communication subsystem enables the wireless device 300 to communicate via a number of different communication protocols including 3G, 4G, GSM, Wi-Fi, Wi-Fi direct, Bluetooth™ and/or CDMA. The communication subsystem of the wireless device 900 is beyond the scope of the described technology.

The keypad 302 and the touch-screen 304 are controlled by an application processor 318. A power and audio controller 320 is provided to supply power from a battery 322 to the communication subsystem, the application processor 318, and the other hardware. The power and audio controller 320 also controls input from the microphone 306, and audio output via the speaker 308. Also provided is a global positioning system (GPS) antenna and associated receiver element 324 which is controlled by the application processor 318 and can receive a GPS signal for use with a satellite navigation functionality of the wireless device 300.

In order for the application processor 318 to operate, various different types of memory are provided. Firstly, the wireless device 300 includes Random Access Memory (RAM) 326 connected to the application processor 318 into which data and program code can be written and read from at will. Code placed anywhere in RAM 326 can be executed by the application processor 318 from the RAM 326. RAM 326 represents a volatile memory of the wireless device 300.

Secondly, the wireless device 300 is provided with a long-term storage 328 connected to the application processor 318. The long-term storage 328 comprises three partitions, an operating system (OS) partition 330, a system partition 332 and a user partition 334. The long-term storage 328 represents a non-volatile memory of the wireless device 300.

The touch-screen 304 can display user interfaces that allow players to participate, in real-time, in games that are being played at the physical game tables 104a/104b. Relevant information (e.g., cards being dealt (in the case of baccarat), the winning numbers/colors (in the case of roulette), the dealer's moves, other mobile or live players' moves and bets) received from the relevant tracking devices (e.g., card tracker 112, roulette sensor 113, cameras 106a/106b/106c/106d, etc.) are displayed through the user interfaces.

In the present example, the OS partition 330 contains the firmware of the wireless device 300 which includes an operating system. Other computer programs may also be stored on the long-term storage 328, such as application programs, and the like. In particular, application programs which are mandatory to the wireless device 300, such as, in the case of a smartphone, communications applications and the like are typically stored in the system partition 332. The application programs stored on the system partition 332 would typically be those which are bundled with the wireless device 300 by the device manufacturer when the wireless device 300 is first sold.

Application programs which are added to the wireless device 300 by the user would usually be stored in the user partition 334.

As stated, the representation of FIG. 3 is schematic. In practice, the various functional components illustrated may be substituted into one and the same component. For example, the long-term storage 328 may comprise NAND flash, NOR flash, a hard disk drive or a combination of these.

Turning back to FIG. 1, the mobile electronic device 162 and ETG consoles 108a/108b are configured to display (e.g., on touch-screen 304) a user interface for allowing a player to participate in the hybrid game. Through the user interface, the user can provide gameplay inputs and receive gameplay outputs. Further details on the user interface will be described below. The system 100 allows players that are physically located away from a physical game table (e.g., physical game tables 104a/104b) to participate, in real-time, in the game being played on the physical game table. One or more tracking devices (e.g., card tracker 112, roulette sensor 113, cameras 106a/106b/106c/106d) provide information on the development of the game (e.g., what cards have been dealt, which numbers/colors have been won, the dealer's moves, other mobile or live players' moves, etc.) and the information can be displayed on the user interface. The players can input their moves (e.g., in the case of baccarat, bets on whether the banker wins, loses or draws; and the corresponding bet amount) through the user interface.

In the hybrid game according to embodiments, the events that occur in the physical real-life environment (e.g., moves made by the live dealer and live players at the casino floor) can be fed to the virtual environment so that a mobile player (using his electronic device or an ETG console located away from the physical game table) can participate in the hybrid game in real-time. Similarly, events that occur in the virtual environment (e.g., moves made by the mobile players using the user interface displayed on the electronic device) can be fed to the physical real-life environment so that a dealer and/or live player can take note of the mobile players' moves. In this manner, the hybrid game comprises gameplay that is conducted in both a virtual and a physical real-life environment. The virtual environment and physical real-life environment co-exist simultaneously such that events that occur in the virtual environment can be experienced in the physical real-life environment, and vice versa. Moreover, as the two environments co-exist simultaneously, any event that occurs in any environment can be seen by all participants (regardless of environment) in real-time.

Embodiments allow higher game participation rates as players that are located away from a physical game table can still participate in the game. For example, a user who is at home or having a meal at the casino's restaurant can participate in the game using his mobile electronic device. Further, the game is not a "full" virtual game where the entire gameplay is administered by a computer. Rather, the presence of live facilitators/croupiers/dealers, and the provision of real-time developments of a game that is being played out on a physical game table, allows a more immersive and realistic gaming experience.

Embodiments can be extended to "wide-area" hybrid gaming, where there is the ability for players to access and bet in different games located at different physical locations within a specific casino and/or other remotely linked casinos (e.g., linked via the Internet), including access to online (internet) casino games. That is, embodiments can be implemented and integrated across multiple casinos (physical environments). For example, if a casino operator has a chain of casinos in various countries, a mobile player (away from the casino, e.g., at home), can be simultaneously playing a hybrid baccarat game (where the physical baccarat game is being played in Singapore) and a hybrid roulette game (where the physical roulette game is being played in Malaysia). Therefore, although FIG. 1 shows a casino floor module 102 with two physical game tables 104a/104b, it is possible connect multiple casino floor modules (from different casinos) to provide "wide-area" hybrid gaming. A "wide-area" hybrid gaming system can include a wide-area jackpot to facilitate the liquidity of progressive jackpots games shared by a number of physical casinos and/or online casinos. The progressive jackpots may be side bets associated with a main table game such as Baccarat or Blackjack, thus enhancing the chance and player's experience in the casino (with the possibility of striking a wide-area progressive jackpot side game).

Embodiments allow players to simultaneously bet on different games while waiting for the completion of a particular game cycle. For example, a player can play roulette while waiting for the game cycle of a live Blackjack table game to finish because some other players on the same Blackjack table may be deliberating on his/her decision to 'hit' or 'stay' in the Blackjack game. Furthermore, embodiments allow players to participate in other online casino games while waiting for the game cycle of live games (e.g., Blackjack or Roulette) to be completed in the live casino.

In an implementation, the hybrid gaming system can further simultaneously broadcast events and game trends of a plurality of different games to players who may be located in different physically separate casinos. The events and game trends can be displayed on an ETG console or mobile electronic device in an intelligently sorted manner. The display of game trends on the ETG console or mobile electronic device can be player customizable. The hybrid gaming system can also be configured to manage wide-area progressive jackpots which may be incorporated as a side bet to a main game and also to provide downloadable mobile applications ("apps") for the mobile devices to enable the devices to provide an appropriate interface for the mobile players to select multiple games to be simultaneously displayed in an intelligent manner on their devices, as well as for trend results to be displayed in real-time.

Figure 4:
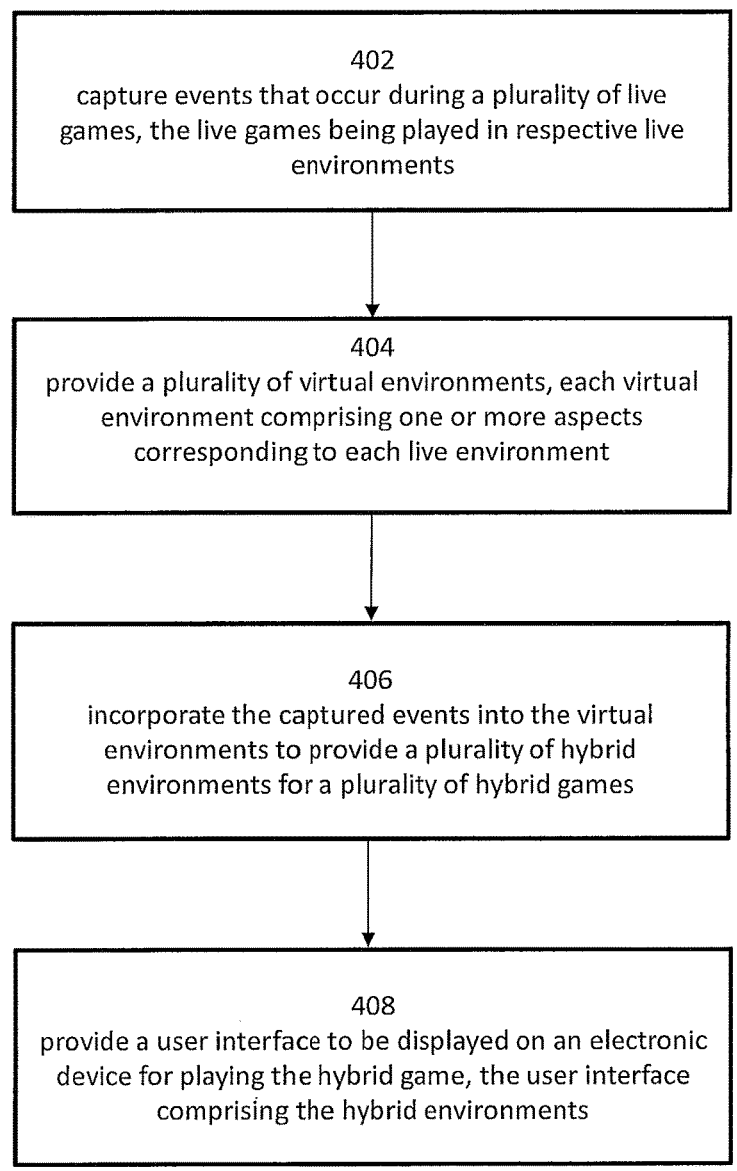
FIG. 4 shows a flowchart depicting a method of conducting a hybrid game, according to an embodiment.

FIG. 4 shows a flowchart depicting steps of a method of hybrid gaming. The method includes the following steps as detailed below and described with reference to FIG. 1. Step 402 involves capturing events that occur during a plurality of live games, the live games being played in respective live environments. Step 404 involves providing a plurality of virtual environments, each virtual environment comprising one or more aspects corresponding to each live environment. Step 406 involves incorporating the captured events into the virtual environments to provide a plurality of hybrid environments for a plurality of hybrid games, wherein the incorporated events in the hybrid games occur substantially in real-time as the events that occur during the live games. Step 408 involves providing a user interface to be displayed on an electronic device for playing the hybrid game, the user interface comprising the hybrid environments. The method of hybrid gaming may further comprise configuring the user interface to concurrently accept a plurality of user inputs for one or more of the hybrid environments. The plurality of user inputs comprises wagers of one or more denominations.

User Interface

The following description relates to user interfaces that allow players to participate in a hybrid game. The mobile electronic device 162 and ETG consoles 108a/108b are configured to display (e.g., on touch-screen 304) the user interfaces shown in FIGS. 5 to 14. Through the user interfaces, players can provide gameplay inputs and receive gameplay outputs.

In an exemplary implementation, the user interface comprises a lobby page and game page(s). The lobby page provides an overview of all the hybrid games that a player is participating in. The game page(s) display one or more sessions of a selected hybrid game in more detail.

Figure 5:
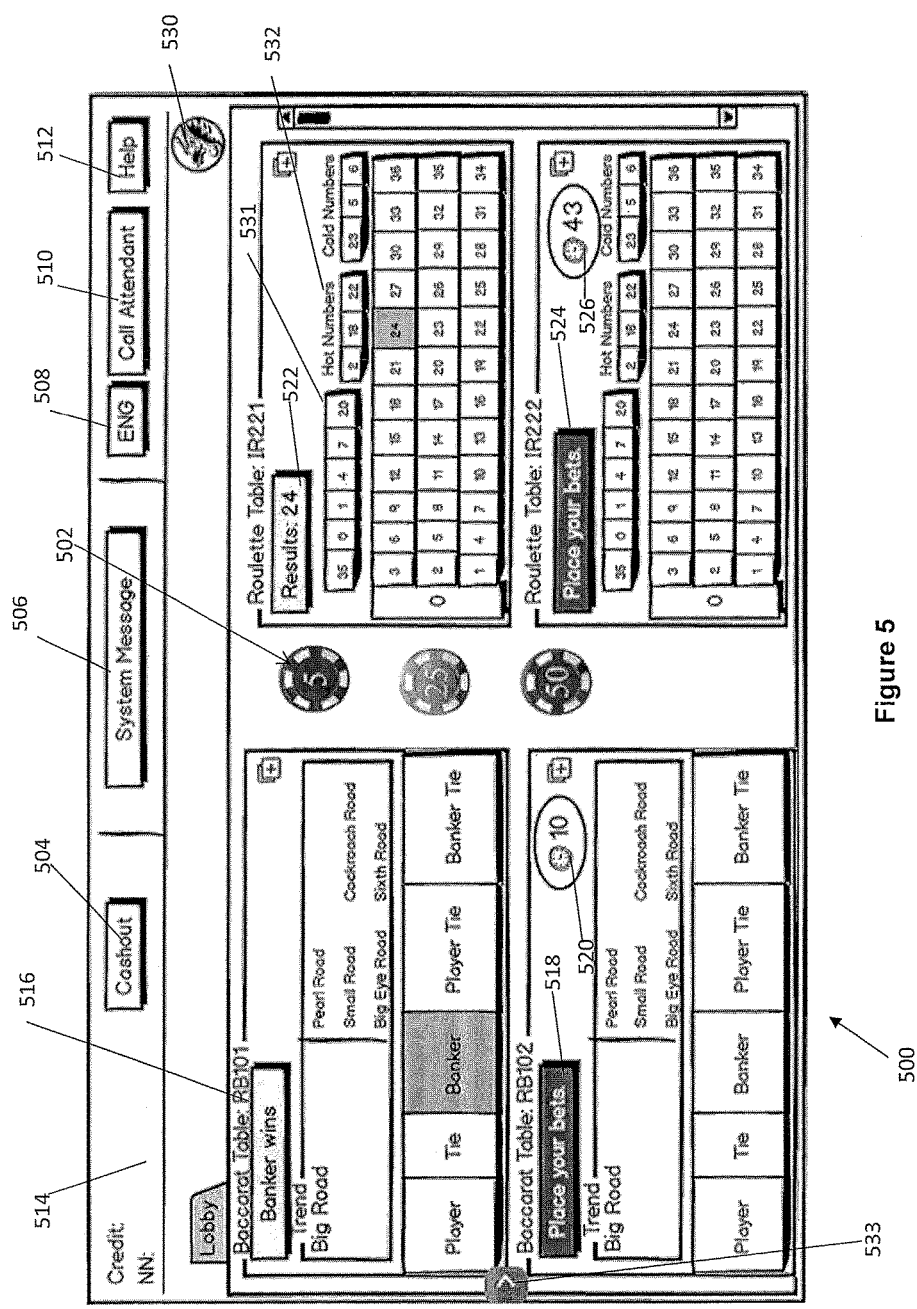
FIG. 5 shows an example of a lobby page of a user interface, according to an embodiment.

FIG. 5 shows an example of a lobby page 500 of a user interface. The lobby page 500 provides an overview of all the hybrid games that a player is participating in. In this case, the user is playing baccarat and roulette, two sessions in each game. Therefore, the lobby page displays four table views (baccarat table RB101, baccarat table RB102, roulette table IR221 and roulette table IR222). The overview includes results, status/developments of the game and other critical information. For example, in baccarat table RB101, it is shown that the banker has won 516 the current round. In baccarat table RB102, the player is prompted to place his bets 518 and the amount of time remaining to place his bets 520 is shown. In roulette table IR221, the winning number "24" of the current round 522 is shown. Finally, in roulette table IR222, the player is prompted to place his bets 524 and the amount of time remaining to place his bets 526 is shown.

The lobby page may also display a player's credit pool (e.g., casino chips). In lobby page 500, casino chips 502 are displayed in the middle of the lobby page 500. The lobby page may also display one or more buttons to activate certain commands, options, settings, etc. In lobby page 500, there are buttons to: encash/cashout the player's winnings 504, read system messages 506, change the user interface language 508 ("ENG" for English), call an attendant 510, or call for help 512. In addition, the lobby page may also display other information 514, such as credit remaining and non-negotiable "NN" credit.

Icon 530 is a "dragon alert" icon which can light up or flash if a certain incident occurs. For example, in a baccarat game, such an incident may be a consecutive winning result (that is defined by the casino) in "Big Road". The "dragon alert" may also be a player-defined dragon alert (e.g., ping-pong dragon). That is, if a ping-pong dragon occurs, the icon 530 may light up or flash to alert the player. History bar 531 may display the winning result of the previous game. Trend results 532 provide "hot" numbers (i.e., most frequent winning numbers) and "cold" numbers (i.e., least frequent winning numbers) based on the results of past games (e.g., statistical data over the last 200 games). Icon 533 can be tapped to display a list of active tables that can be played.

Figure 6:
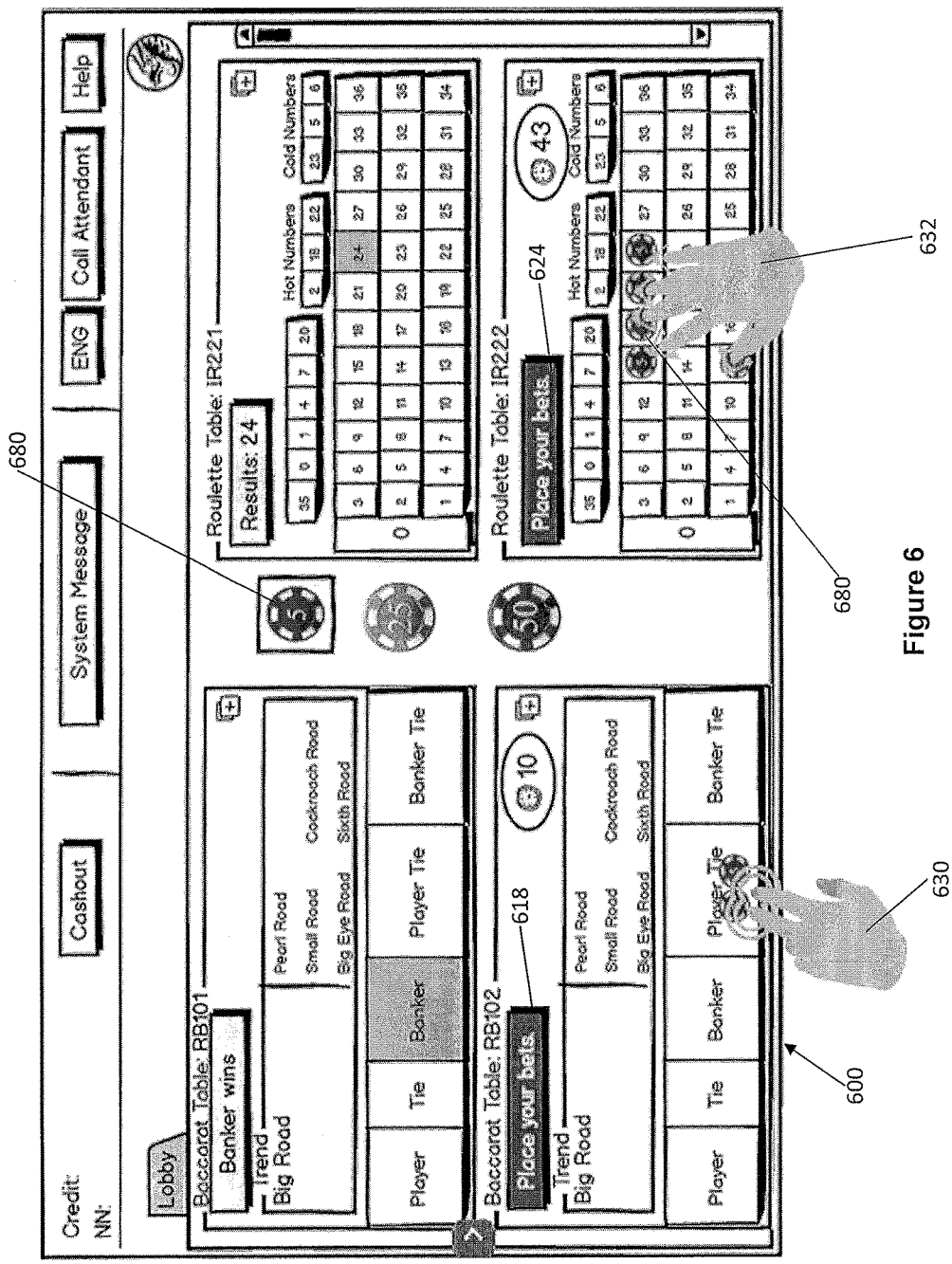
FIG. 6 shows an example of another lobby page of a user interface, according to an embodiment.

FIG. 6 shows an example of a lobby page 600 of a user interface that is similar to lobby page 500. At lobby page 600, a player can place his bets on eligible sessions. In this case, baccarat table RB102 and roulette table IR222 are awaiting the player's bets, as indicated by prompts 618/624. In an implementation, the user interface can be configured to support multiple touch points in order for a player to provide multiple inputs (e.g., bets). For example, the user interface can be configured to support ten touch points so that the player can play with both hands (i.e., place ten bets, one bet per finger). At lobby page 600, the player uses two fingers on his left hand 630 to place a bet (of two casino chips 680 of the same value) on a "player tie" for the on-going session at baccarat table RB102. Subsequently or simultaneously, the player also uses all five fingers on his right hand 632 to place five bets (of one casino chip 680 each, all having the same value) on numbers "13", "15", "18", "21" and "24" for the on-going session at roulette table IR222. The ability to support multiple touch points allows players to provide a plurality of inputs (e.g., bets). In games such as roulette, where it is common to place multiple bets on the physical game table, the user interface can provide a more immersive and realistic gaming experience to the mobile player by mimicking moves that are performed during a live game.

Besides facilitating the fast placing of bets using multiple denominated betting chips (i.e., chips with different values), "multi-touch betting" facilitates the 'sprinkling of betting chips' on games such as roulette (where multiple betting options are accepted), thereby making the placement of bets more efficient with respect to multiple betting options as well as multiple denomination betting. In addition, as the lobby page can support a plurality of inputs (e.g., bets) across different sessions of different games, players are able to concurrently participate in more than one session of more than one game (e.g., two sessions of baccarat and two sessions of roulette, as shown in lobby page 600). This is in contrast to the prior art where inputs (e.g., bets) in relation to only one session of a particular game are accepted at any one time.

Simultaneous gaming at multiple tables of different games provides more opportunities for players to exploit the odds. Also, novice players can pick up the gameplay faster when playing simultaneous games at multiple tables. Furthermore, simultaneous gaming at multiple tables of different games may increase the gaming revenue for casinos as more bets are placed within a certain period of time.

Figure 7:
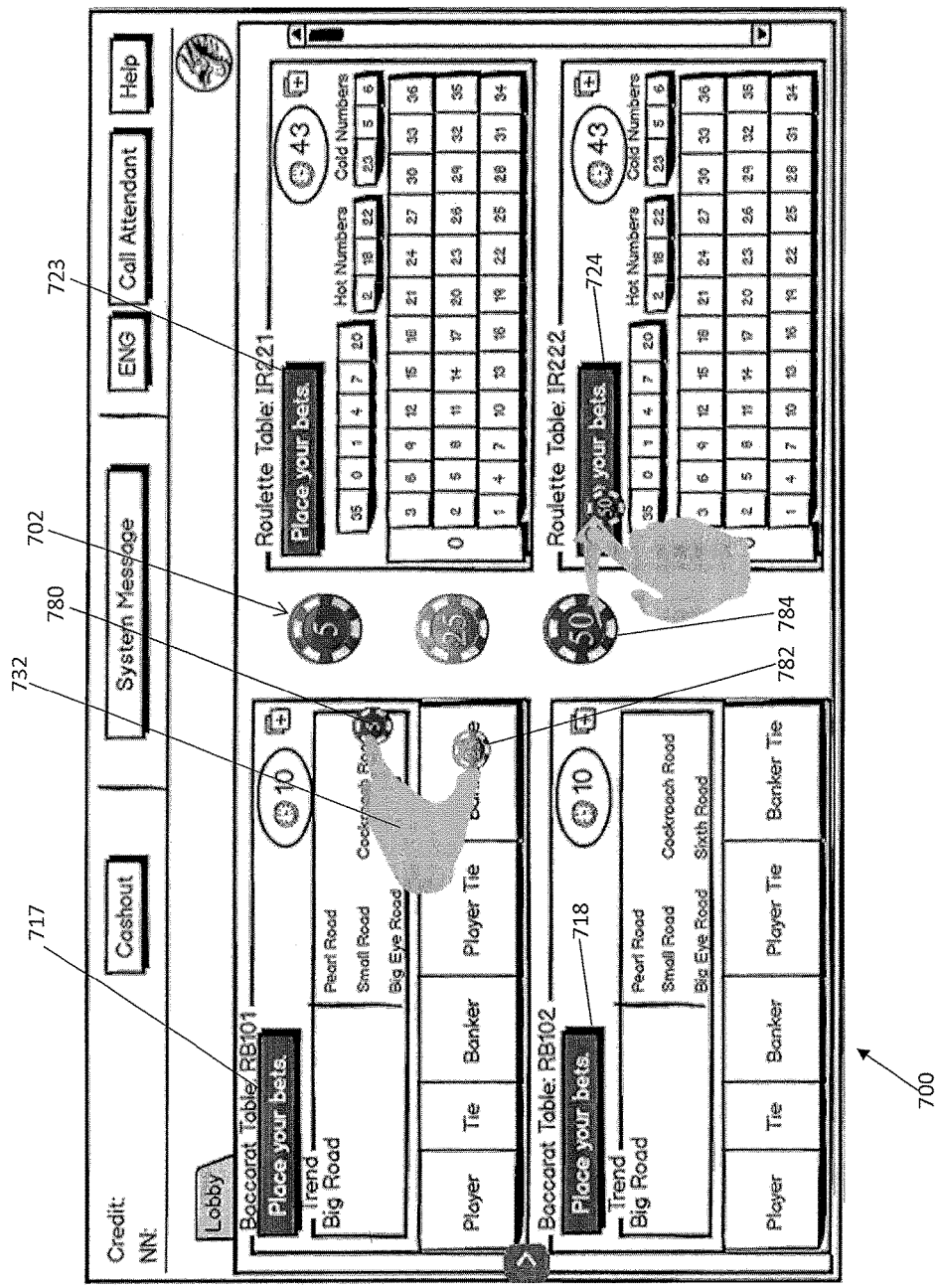
FIG. 7 shows an example of yet another lobby page of a user interface, according to an embodiment.

FIG. 7 shows an example of a lobby page 700 of a user interface that is similar to lobby pages 500 and 600. In an implementation, the user interface can be configured to support multiple simultaneous drag-and-drop gestures so that mobile players can provide a plurality of simultaneous drag-and-drop type inputs. For example, a mobile player can drag different casino chips from his credit pool 702 onto various betting areas simultaneously. At lobby page 700, a player can place simultaneous bets on eligible sessions. In this case, baccarat table RB101, baccarat table RB102, roulette table IR221 and roulette table IR222 are awaiting the player's bets, as indicated by prompts 717/718/723/724. The user interface can be configured to support multiple touch points so that similar to lobby page 600, a player is able to provide multiple inputs (e.g., bets). At lobby page 700, the player uses his right hand 732 to simultaneously place a bet of two casino different chips, one 780 on a "banker tie" and the other 782 on "pearl/small/big eye/cockroach/sixth road" for the on-going session at baccarat table RB101. At the same time, the player also uses all five fingers on his left hand to place a bet of one casino chip 784 (that is of different value from the two casino chips above) for the on-going session at roulette table IR222. The ability to support multiple simultaneous drag-and-drop gestures allows players to provide a plurality of simultaneous drag-and-drop type inputs across different sessions of different games. In games such as roulette, where it is common to place multiple different bets on the physical game table simultaneously, the user interface can provide a more immersive and realistic gaming experience to the mobile player by mimicking moves that are performed during a live game.

Now turning to the game pages, the game pages display one or more sessions of a selected game in more detail. In an implementation, the game page may display a single session of a selected game in more detail. That is, if there are multiple sessions of a selected game, the user interface provides multiple game pages of the selected game. For example, with reference to FIG. 5, if a player is participating in four sessions (at baccarat table RB101, baccarat table RB102, roulette table IR221 and roulette table IR222), the user interface provides two baccarat game pages (one for baccarat table RB101 and one for baccarat table RB102) and two roulette game pages (one for roulette table IR221 and one for roulette table IR222).

In another implementation, the game page may display multiple sessions of a selected game in more detail. For example, with reference to FIG. 5, if a player is participating in four sessions (at baccarat table RB101, baccarat table RB102, roulette table IR221 and roulette table IR222), the user interface may provide one baccarat game page (displaying both baccarat tables RB101 and RB102) and one roulette game page (displaying both roulette tables IR221 and IR222).

Figure 8:
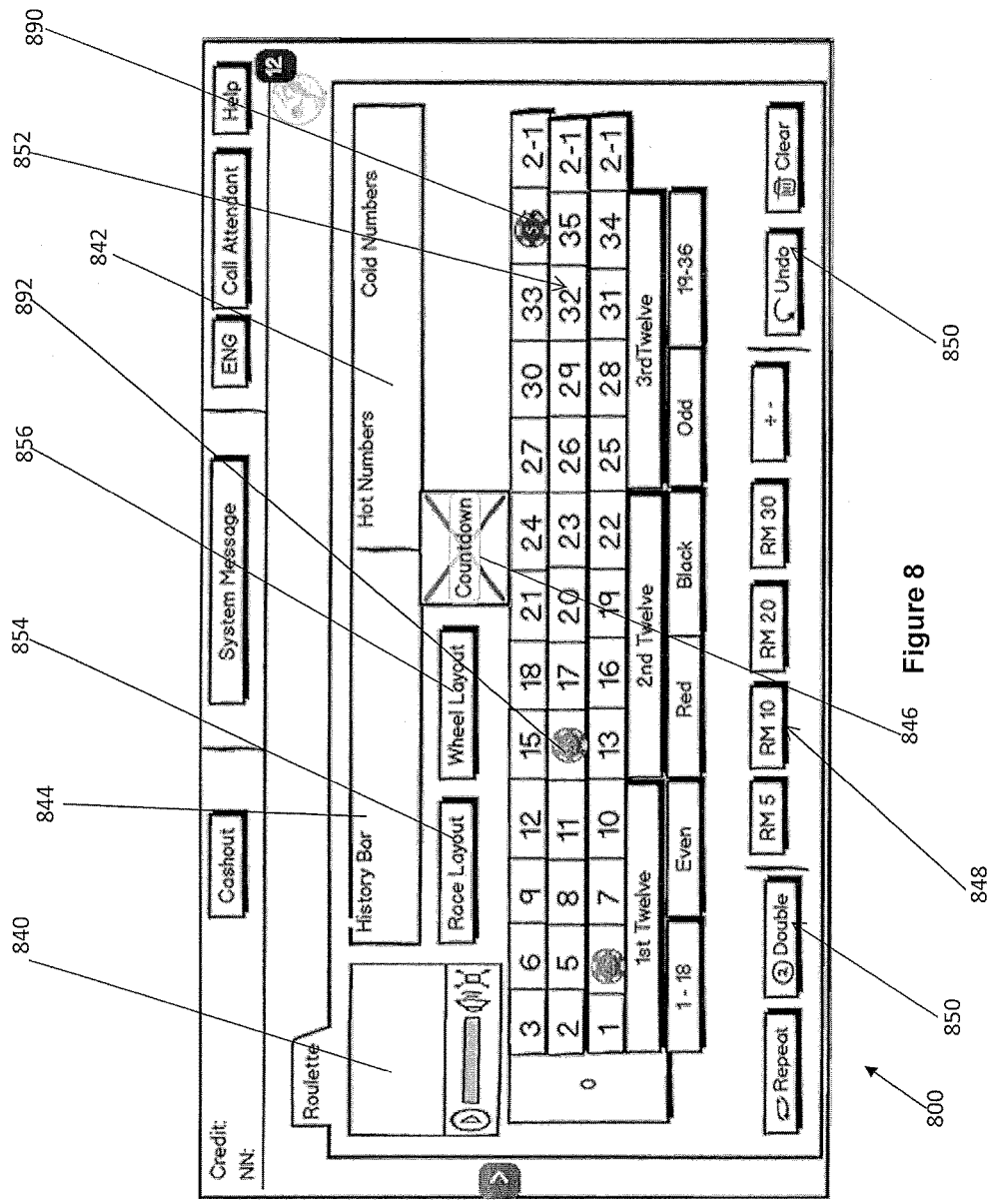
FIG. 8 shows an example of a game page of a user interface, according to an embodiment.

FIG. 8 shows an example of a game page 800 of a user interface. The game page 800 shows the implementation where the game page displays a single session of a selected game in more detail. In this case, game page 800 provides details of one session of roulette. For example, compared to roulette table IR221 of the lobby page 500, the game page 800 provides more information and/or command options on the particular session of roulette, including:

a. video/still images 840 of the game that is being played at the physical game table, such as the dealer's actions, developments of the game (winnings numbers/colours), actions of live players. Cameras 106a/106b/106c/106d capture the video and/or still images b. statistics 842 or trends of previous rounds that were played at the physical game table c. result 844 of the last (or current) round that was (or is) played at the physical game table. For example, the roulette sensor 113 detects the result of the round and sends the result to the dealer console 110b. Assuming that the result is detected correctly, the dealer 114b confirms the result on the dealer console 110b. Upon confirmation, the dealer console 110b then sends the result to the pit server 109. The result is synchronised from the pit server 109 to game & database server 144 and/or ETG consoles 108a/108b for display on the game page 800. The game & database server 144 may be configured to send the result to the mobile electronic device 162 and/or ETG consoles 108a/108b for display on the game page 800.

d. countdown 846 of the time remaining to make the next move (e.g., place a bet)

e. betting options 848 (e.g., different bet denominations)

f. first command options 850 (e.g., to repeat the last action, to double the previous bet, to undo the latest action, to clear all bets)

g. second command option 854 to view the race layout h. third command option 856 to view the roulette wheel layout i. view of virtual game table 852, showing either: (i) bets from the user only (e.g., chip 890), or (ii) bets from the user and aggregate bets from other mobile players (e.g., chip 892). Here, "mobile players" refers to players participating in the hybrid game through an ETG console or a mobile electronic device, i.e., not physically present at a physical roulette game table in the casino.

Figure 9A:
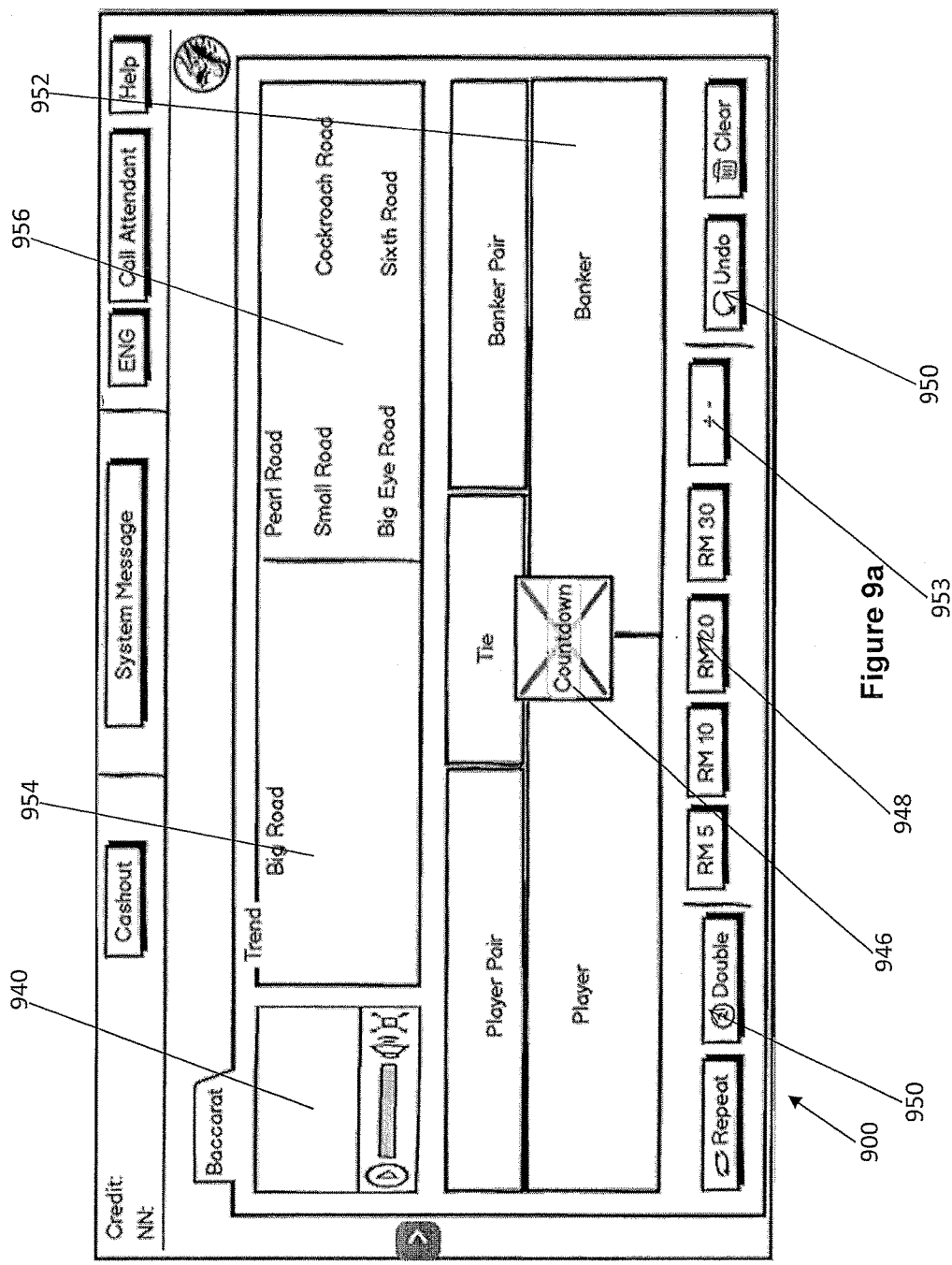
FIGS. 9a and 9b show an example of another game page of a user interface, according to an embodiment.
Figure 9B:
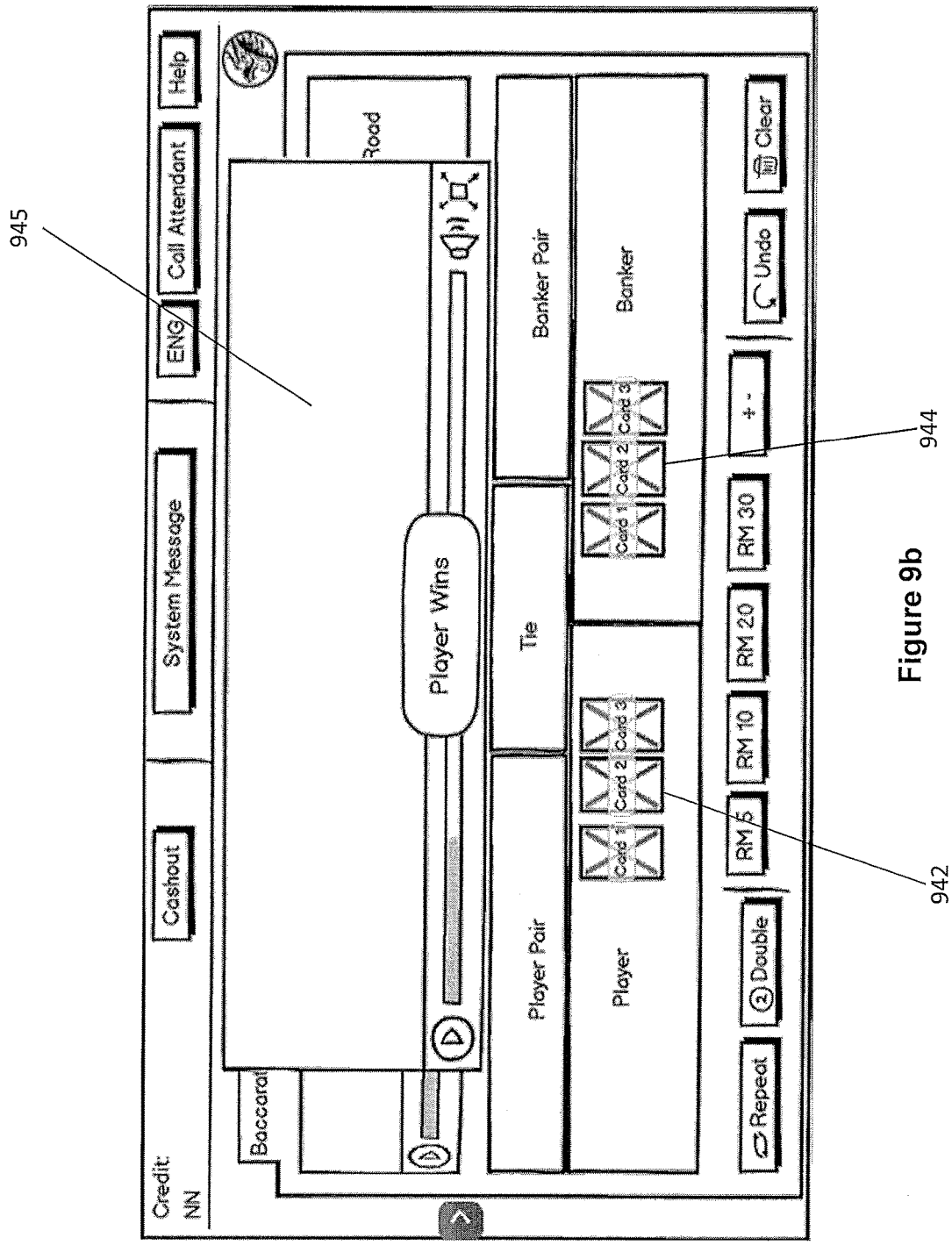

FIGS. 9a and 9b show an example of a game page 900 of a user interface. The game page 900 shows the implementation where the game page displays a single session of a selected game in more detail. In this case, game page 900 provides details of one session of baccarat. For example, compared to roulette table RB 101 of the lobby page 500, the game page 900 provides more information and/or command options on the particular session of baccarat, including:

a. video/still images 940 of the game that is being played at the physical game table, such as the dealer's actions, developments of the game (e.g., cards being dealt), actions of live players. Cameras 106a/106b/106c/106d capture the video and/or still images b. limited interactive video images 945 (see FIG. 9b) such as the selection of an option for the display of folded cards with an animated card squeezing feature. The video images 945 may temporarily overlay display shown in FIG. 9a.

c. indications whether the player wins 942 or the banker wins 944 the current round (see FIG. 9b). For example, virtual cards may be displayed at boxes 942/944. This may be implemented as follows. The card tracker 112 detects the cards that are dealt and sends the result to the dealer console 110a. Assuming that the dealt cards are detected correctly, the dealer 114a confirms the result on the dealer console 110a. Upon confirmation, the dealer console 110a then sends the result to the game & database server 144. The result is recorded at the game & database server 144. The game & database server 144 is also configured to send the result to the mobile electronic device 162 and/or ETG consoles 108*a*/108*b* for display on the game page 900 (e.g., at boxes 942/944).

d. countdown 946 of the time remaining to make the next move (e.g., place a bet)

e. betting options 948 (e.g., different bet denominations)

f. command options 950 (e.g., to repeat the last action, to double the previous bet, to undo the latest action, to clear all bets)

g. display of trends corresponding to a "big road" 954 h. display of trends corresponding to a "pearl/small/big eye/cockroach/sixth road" 956 i. view of virtual game table 952, showing either: (i) bets from the user only, or (ii) bets from the user and aggregate bets from other mobile players. Here, "mobile players" refers to players participating in the hybrid game through an ETG console or a mobile electronic device, i.e., not physically present at a physical baccarat game table in the casino j. option button 953 to enable players to define a chip denomination for use in a particular game session, and upon clock out, the denomination will be reset to minimum denomination of the table.

Figure 10A:
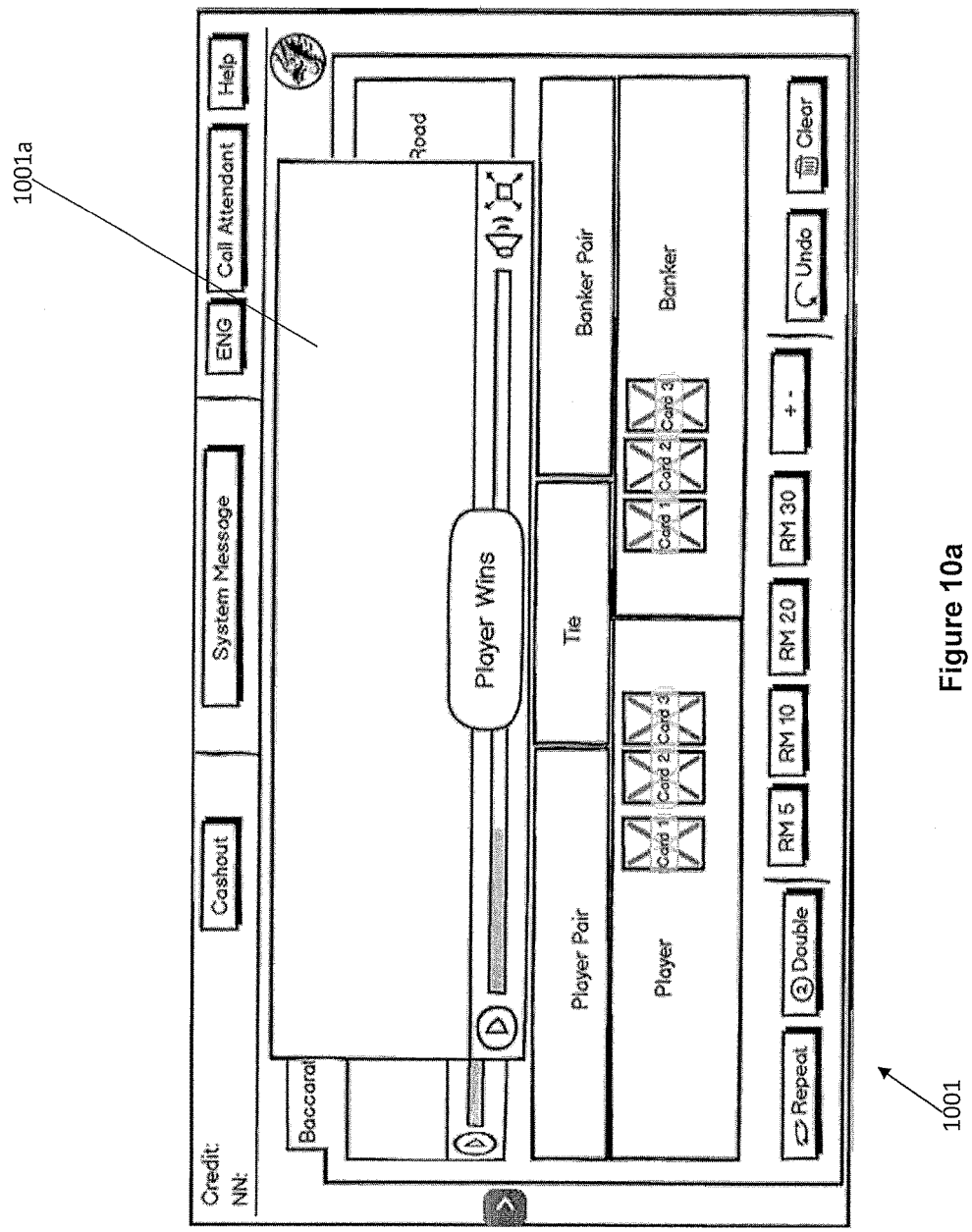
FIGS. 10a and 10b show an example of game pages of a user interface, according to an embodiment.
Figure 10B:
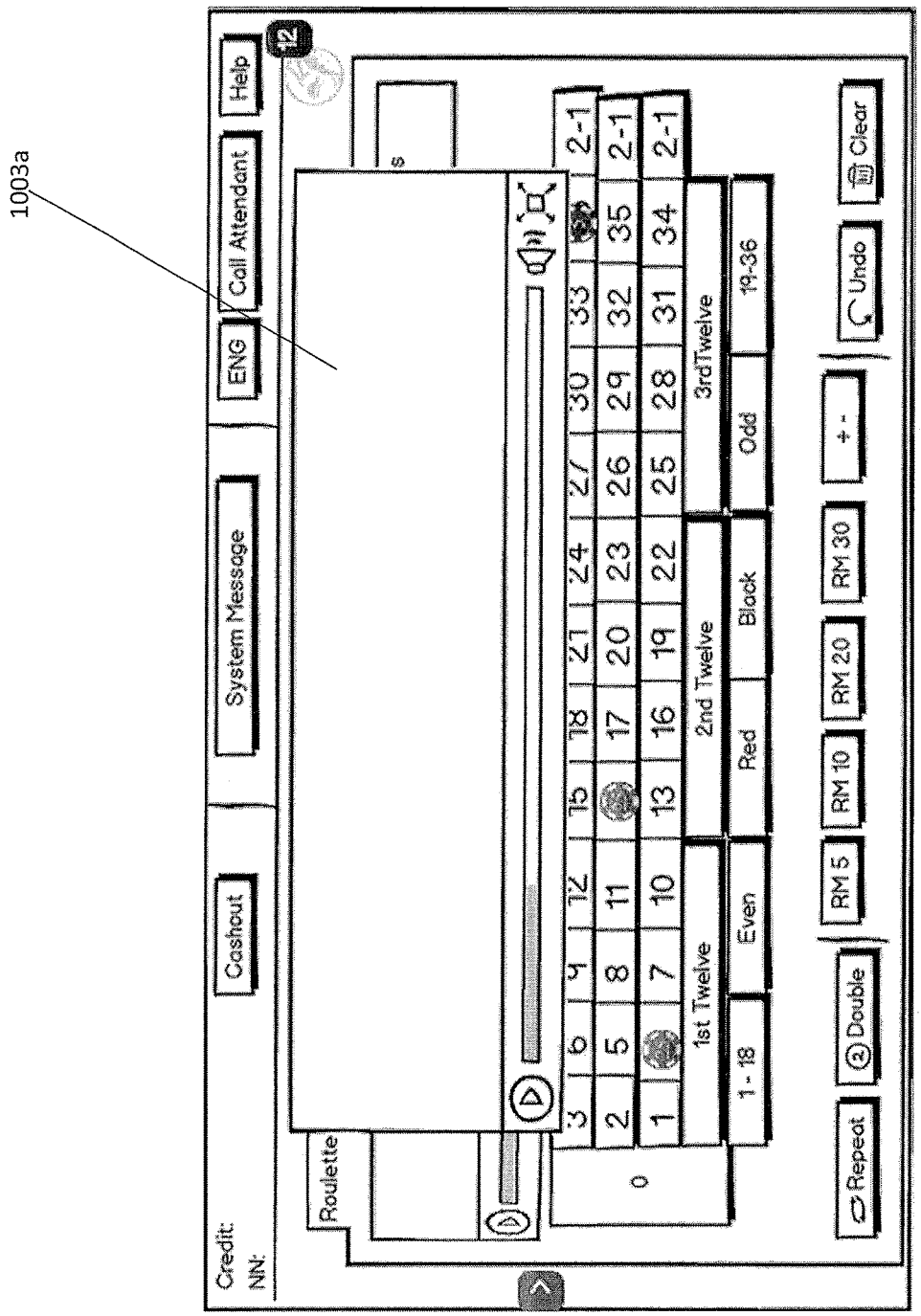

FIGS. 10*a* and 10*b* show an example of game pages 1001 and 1003 of a user interface. Game page 1001 is similar to game page 900, but has an additional enlarged zoom-in display 1001*a* of the video stream/still image 940. Game page 1003 is similar to game page 800, but has an additional enlarged zoom-in display 1003*a* of the video stream/still image 840. In one implementation, the enlarged zoom-in displays 1001*a*/1003*a* can be activated manually, e.g., by pressing a button (not shown) on the touch screen. Configuring the user interface to provide the option of an enlarged zoom-in displays may result in a better gaming experience as players may be keen to clearly see the outcome of certain critical events (e.g., which cards were dealt).

In another implementation, the enlarged zoom-in displays 1001*a*/1003*a* can be activated automatically, e.g., during a certain event. For instance, the enlarged zoom-in displays 1001*a*/1003*a* can be automatically activated when a dealer starts dealing card (for a baccarat game on game page 1001), when a dealer spins the roulette wheel (for a roulette game on game page 1003), or after the dealer activates the "no more bets" command on the dealer console. Configuring the user interface to provide automatic activation of the enlarged zoom-in displays may result in a more exciting gaming experience as players may be keen to monitor the outcome of certain critical events (e.g., which cards were dealt).

Figure 11:
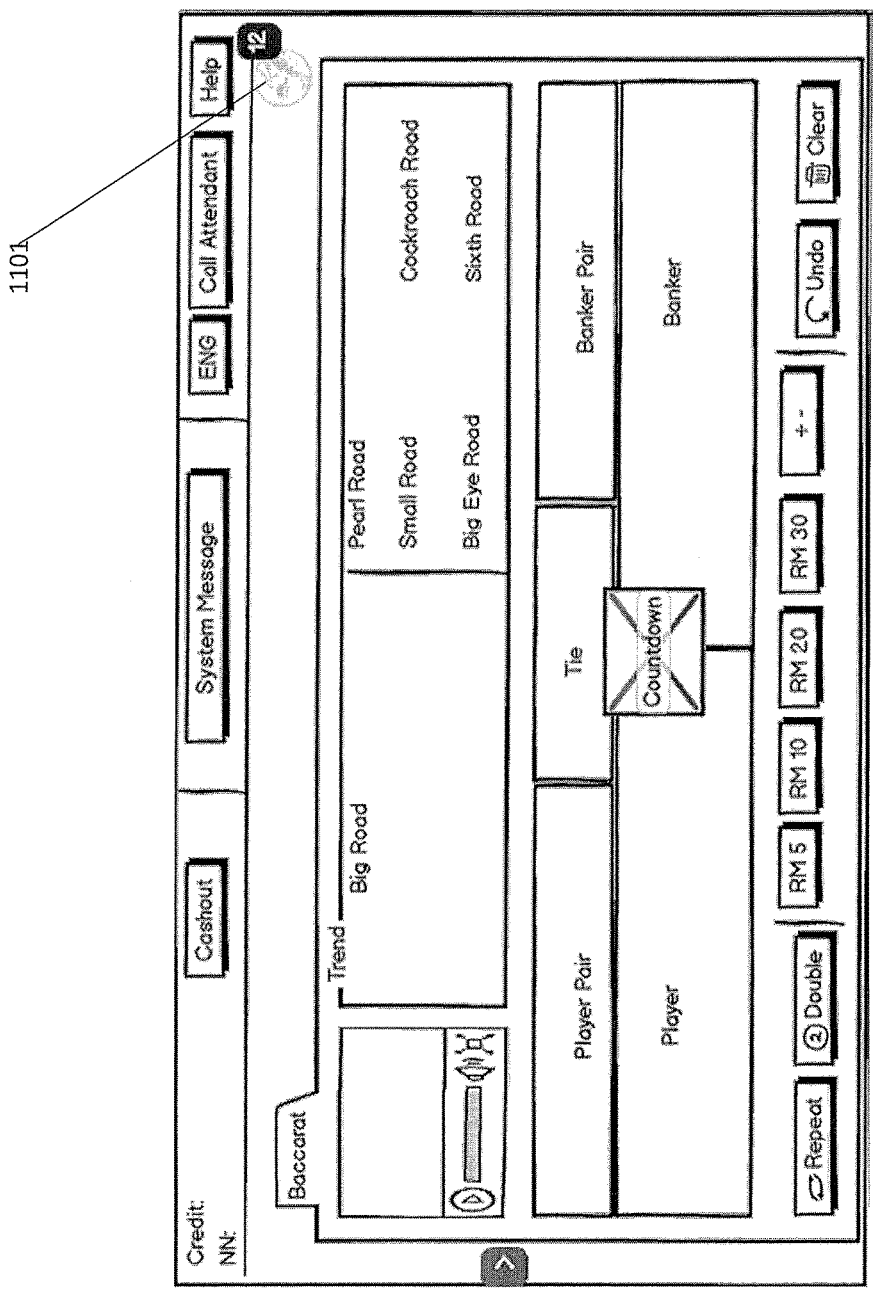
FIG. 11 shows an example of a game page of a user interface, according to an embodiment.

FIG. 11 shows an example of game page 1100 of a user interface. Game page 1100 is similar to game page 900, but has an additional incident notifier/event alert indication 1101. The event alert indication 1101 can be configured to trigger/appear (optionally with an audio alert, e.g., through speaker 234) when a certain pre-determined incident/event occurs. For instance, in FIG. 11, event alert indication 1101 shows a dragon icon that represents a "dragon alert" when the predefined result patterns of a "big road" is matched. This event alert indication 1101 seeks to alert players of the occurrence of certain events so that action may be taken. For example, the player can tap on the dragon icon in order to access a list of baccarat tables with different "dragons". The game & database server 144 may record and monitor the results of past games and may be configured to trigger the "dragon alert" when the results of past games match the predefined results pattern.

Figures 12A, 12B:
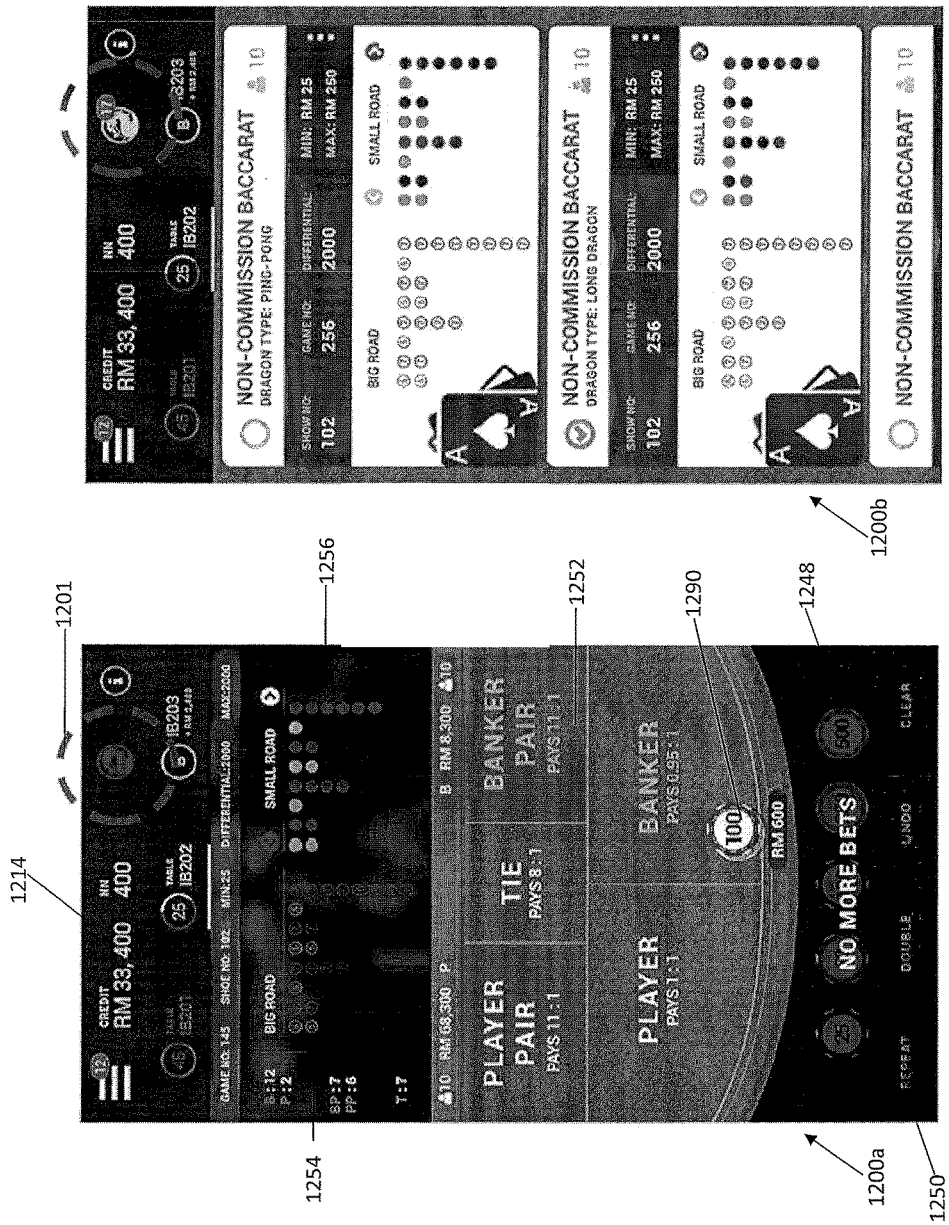
FIGS. 12a and 12b show an example of game pages of a user interface, according to an embodiment.
Figure 13D:
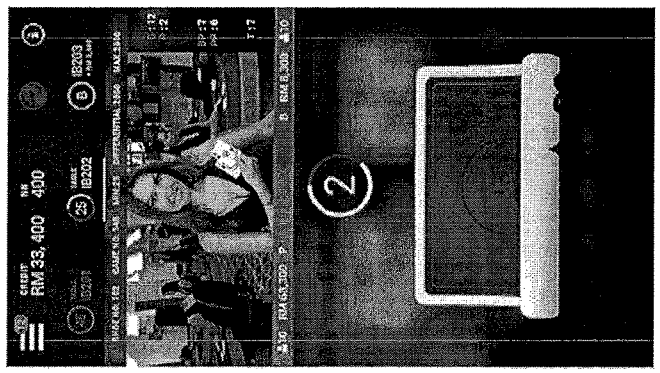
FIGS. 13a-13d show an example of game pages of a user interface, according to an embodiment.
Figure 13C:
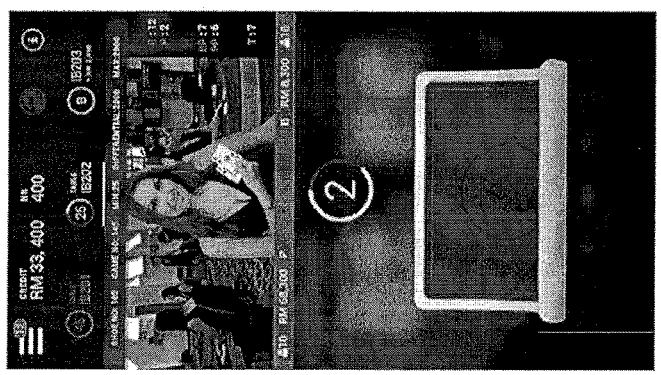
Figure 13B:
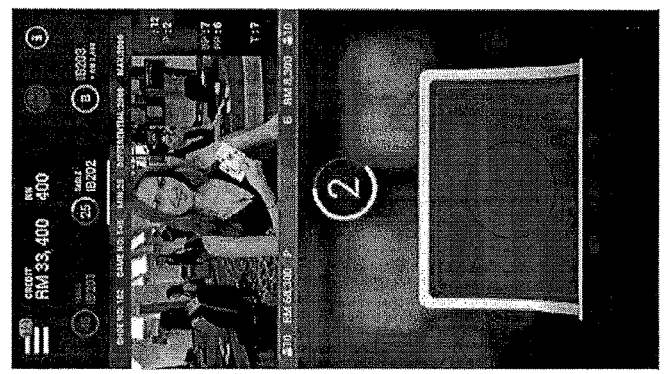
Figure 13A:
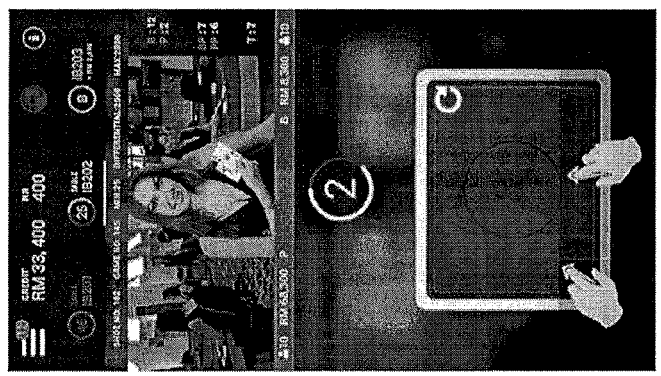

FIGS. 12*a* and 12*b* show an alternative user interface of a baccarat game page. The game page 1200*a* shown in FIG. 12*a* may include the following display items. Display items a.-g. below are similar to those of game pages 900 and 1100, and therefore will not be elaborated further.

a. an indication of the credit (normal and non-negotiable ("NN")) remaining 1214 b. an event alert indication icon 1201 that can be configured to appear or light up when a certain event occurs, e.g., "dragon alert" described above. Users may define their own "dragon" pattern or choose to receive an alert based on a pre-defined "dragon" pattern.

c. display of trends corresponding to a "big road" 1254 d. display of trends corresponding to a "small road" 1256 e. view of virtual game table 1252, showing either: (i) bets from the user only (e.g., 1290), or (ii) bets from the user and aggregate bets from other mobile players. Here, "mobile players" refers to players participating in the hybrid game through an ETG console or a mobile electronic device, i.e., not physically present at a physical baccarat game table in the casino f. betting options 1248 (e.g., different bet denominations), or when applicable, an indication that no more bets are allowed to be placed g. command options 1250 (e.g., to repeat the last action, to double the previous bet, to undo the latest action, to clear all bets)

In an example implementation, if the event alert indication icon 1201 in game page 1200*a* appears/lights up and is tapped, the game page 1200*b* is displayed. Game page 1200*b* displays various trends or result histories of different hybrid game(s). For example, in game page 1200*b*, the trends ("ping-pong" and "long dragon") of a particular hybrid baccarat game being played at table "IB202" are displayed. The user may also view the trends or result histories of other hybrid games, e.g., the games played at table "IB201" and "IB203". An example user action to toggle between the trends or result histories of other hybrid games may be "swiping" the screen to the left or right.

FIGS. 13*a*-13*d* and 14*a*-14*b* show examples of game pages of a user interface that allow players to "squeeze" cards. This user interface is suitable for games where cards are used (e.g., baccarat, blackjack, etc.). For example, when playing baccarat, players squeeze the cards in order to slowly reveal the value of the card. This may prolong excitement and tension by slowly revealing small sections of the card at a time. Squeezing the cards in baccarat does not change the value of the cards or have any impact over what cards are dealt.

Turning to FIGS. 13*a*-13*d*, the user interface allows a player to squeeze (i.e., slowly reveal) the value of the card. The person who has the biggest bet may be given the right to squeeze the cards or nominate someone else to open the cards. Alternatively, a "mass card squeeze" can be allowed where all players are allowed to squeeze the cards. In one implementation, a player uses his finger(s) to push the long edge of the card forward in order to cause the long edge of the card to roll over to slowly reveal the value of the card. Alternatively, the player uses his index finger(s) to press a portion of the card down while simultaneously using his thumb push the long edge of the card forward in order to cause the long edge of the card to roll over to slowly reveal the value of the card. Other possible user actions to "squeeze" the card include: (i) double tapping the card to be "squeezed" and (ii) dragging the card to be "squeezed" from all corners.

Figure 14B:
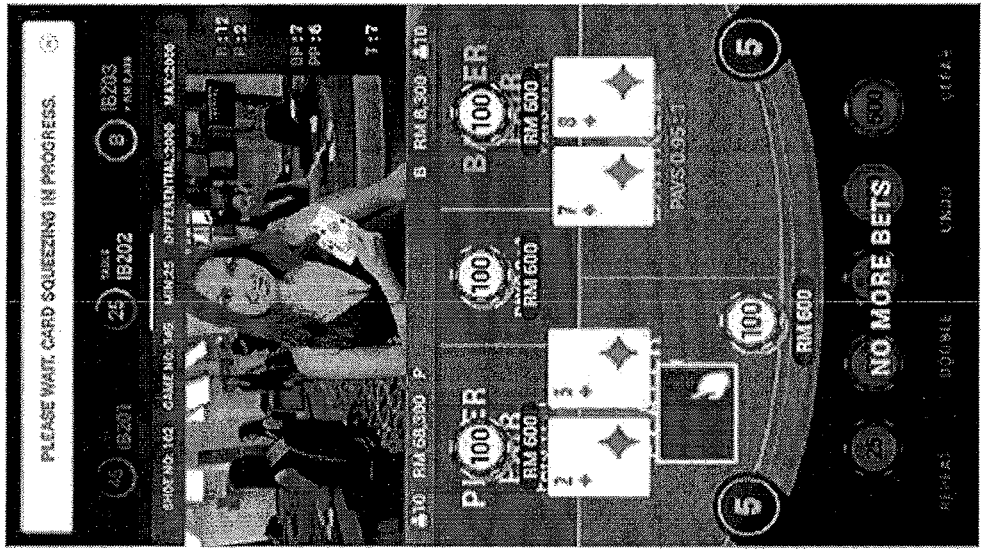
FIGS. 14a-14b show an example of game pages of a user interface, according to an embodiment.
Figure 14A:
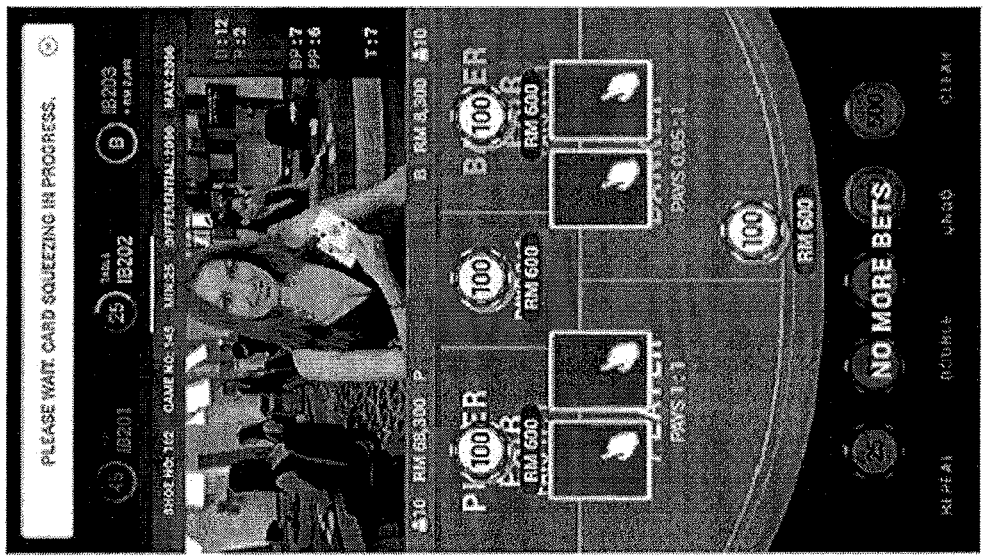

With reference to FIGS. 14a-14b, in another implementation, a player can tap a button (not shown) on the user interface or tap the card itself to automatically squeeze the card, i.e., the value of the card is slowly revealed automatically. For example, the player taps the cards shown in FIG. 14a. Over a certain period of time (e.g., 5 seconds), the side of the card that is facing down is slowly revealed automatically, and FIG. 14b shows the cards being entirely revealed after the certain period of time.

A user interface that allows players to squeeze the cards or automatically squeezes the cards can provide a more exciting and engaging gaming experience compared to a user interface that is only capable of instantaneous card revealing. Squeezing the cards at the physical game table (e.g., baccarat game table) is a common practice and allowing mobile players to mimic "real-life" actions enhances the realism of the game.

In an embodiment, there is provided an electronic device comprising: a display screen, at least one processor, and at least one memory including computer program code. The at least one memory and the computer program code are configured to, with the at least one processor, cause the device at least to display a user interface on the display screen, the user interface comprising a plurality of hybrid environments, each hybrid environment comprising a virtual environment with events that occur in a live environment incorporated therein, wherein the incorporated events in the hybrid environment occur substantially in real-time as the events that occur in the live environment and concurrently accept a plurality of user inputs for one or more of the hybrid environments. The plurality of user inputs may comprise wagers of one or more denominations. The electronic device may be a mobile electronic device (such as a mobile phone, computer tablet, laptop PC) or an electronic table game console.

Example Additional Embodiments

One embodiment is a system for incorporating captured live event data into one or more virtual environments, comprising: a plurality of digital video capturing devices configured to capture real-time events that occur during a plurality of live events in respective live environments to generate real-time multimedia data; and a computing system comprising one or more computing devices including a streaming server in communication with the digital video capturing devices, the streaming server configured to receive the real-time multimedia data from the digital video capturing devices, the computing system configured to: generate virtual multimedia data containing a plurality of virtual environments respectively corresponding to the live environments; incorporate the real-time multimedia data and the virtual multimedia data to generate hybrid multimedia data for a plurality of hybrid events in respective hybrid environments such that the hybrid events occur substantially simultaneously with the real-time events; transmit the generated hybrid multimedia data to a mobile electronic device; and provide a user interface to be displayed on the mobile electronic device, wherein the user interface presents the hybrid environments, and wherein the user interface further comprises an incident notifier configured to trigger a notification when a pre-determined trend of results of at least one of the hybrid events occurs.

In the above system, the computer system further comprises a database server configured to: generate the virtual multimedia data; incorporate the real-time multimedia data and the virtual multimedia data to generate the hybrid multimedia data; and transmit the generated hybrid multimedia data to the mobile electronic device. In the above system, the mobile electronic device comprises a mobile phone.

Another embodiment is a system for incorporating captured live event data into one or more virtual environments, comprising: a plurality of tracking devices configured to capture real-time events that occur during a plurality of live games to generate real-time multimedia data, the live games being played in respective live environments; a computer system in communication with the tracking devices, the computer system configured to: receive the real-time multimedia data from the tracking devices; provide virtual multimedia data corresponding to a plurality of virtual environments each comprising one or more aspects corresponding to a live environment; combine the real-time multimedia data and the virtual multimedia data to generate hybrid multimedia data, so as to incorporate the captured events into the virtual environments to provide a plurality of hybrid environments for a plurality of hybrid games, wherein the incorporated events in the hybrid environments occur substantially in real-time as the events that occur during the live games; transmit the generated hybrid multimedia data to an electronic device; and provide a user interface to be displayed on the electronic device for playing the hybrid games, the user interface comprising the hybrid environments, wherein the user interface further comprises an incident notifier configured to trigger a notification when a pre-determined trend of results of at least one of the hybrid games occurs.

In the above system, the tracking devices comprise: a digital image capturing device; a digital video capturing device; a card tracker configured to detect an identity of a playing card that is being dealt; and/or a roulette wheel sensor configured to detect a result of a roulette wheel spin. In the above system, the real-time events comprise: dealing of the playing card; the identity of the playing card; spinning of a roulette wheel; and/or the result of the roulette wheel spin. In the above system, the aspects comprise: at least a portion of a baccarat or roulette game table; wager(s) placed by a user of the electronic device; and/or remaining credit belonging to the user of the electronic device. In the above system, the electronic device comprises: a mobile electronic device; or an electronic table game console. In the above system, the computer system comprises: a streaming server configured to: receive the real-time multimedia data from the tracking devices; and a game and database server configured to: provide the virtual multimedia data; incorporate the real-time multimedia data received from the streaming server into the virtual multimedia data to generate the hybrid multimedia data; and transmit generated hybrid multimedia data to the electronic device. In the above system, the game and database server is further configured to generate an Intranet-enabled virtual environment. In the above system, the user interface comprises an image of a virtual playing card, and wherein a viewing angle of the virtual card is configured to vary to progressively reveal the identity of the virtual playing card. In the above system, the user interface comprises an enlarged display configured to display at least one of the real-time events. In the above system, the user interface is configured to concurrently receive a plurality of user inputs for one or more of the hybrid environments. In the above system, the plurality of user inputs comprise wagers of one or more denominations. In the above system, the live games comprise: electronic gaming tables; electronic table games; and/or conventional gaming tables.

Another embodiment is a method of incorporating captured live event data into one or more virtual environments, comprising: capturing real-time events that occur during a plurality of live games, played in respective live environments to generate real-time multimedia data; providing virtual multimedia data containing a plurality of virtual environments, each virtual environment comprising one or more aspects corresponding to each live environment; combining the real-time multimedia data and the virtual multimedia data to generate hybrid multimedia data, so as to incorporate the captured events into the virtual environments to provide a plurality of hybrid environments for a plurality of hybrid games, wherein the incorporated events in the hybrid games occur substantially in real-time as the real-time events; transmitting the generated hybrid multimedia data to an electronic device; and providing a user interface to be displayed on the electronic device for playing the hybrid games, wherein the user interface comprises an incident notifier configured to trigger a notification when a pre-determined trend of results of at least one of the hybrid games occurs.

The above method further comprises controlling the user interface to concurrently receive a plurality of user inputs for one or more of the hybrid environments. In the above method, the plurality of user inputs comprise wagers of one or more denominations. The above method further comprises increasing a player capacity of each one of the live games with the use of the virtual environments.

Another embodiment is an electronic device for processing multimedia data that incorporates captured live event data into one or more virtual environments, comprising: a display screen; at least one processor; and at least one memory including computer program code, the computer program code configured to, with the at least one processor, cause the electronic device to: display a user interface on the display screen, the user interface comprising a plurality of hybrid environments for an equal plurality of hybrid games, each hybrid environment comprising a virtual environment with events that occur in a live environment incorporated therein, wherein the incorporated events in the hybrid environment occur substantially in real-time as the events that occur in the live environment; and receive and process multimedia data associated with the hybrid environments for playing the hybrid games, wherein the user interface comprises an incident notifier configured to trigger a notification when a pre-determined trend of results of at least one of the hybrid games occurs.

In the above electronic device, the plurality of user inputs comprise wagers of one or more denominations.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A system for incorporating captured live event data into one or more virtual environments, comprising:
   a plurality of digital video capturing devices configured to capture real-time events that occur during a plurality of live events in respective live environments to generate real-time multimedia data; and
   a computing system comprising one or more computing devices including a streaming server in communication with the digital video capturing devices, the streaming server configured to receive the real-time multimedia data from the digital video capturing devices, the computing system configured to:
   generate virtual multimedia data containing a plurality of virtual environments respectively corresponding to the live environments;
   incorporate the real-time multimedia data and the virtual multimedia data to generate hybrid multimedia data for a plurality of hybrid events in respective hybrid environments such that the hybrid events occur substantially simultaneously with the real-time events;
   transmit the generated hybrid multimedia data to a mobile electronic device; and
   provide a user interface to be displayed on the mobile electronic device, wherein the user interface presents the hybrid environments, and wherein the user interface further comprises an incident notifier configured to trigger a notification when a pre-determined trend of results of at least one of the hybrid events occurs.

2. The system as claimed in claim 1, wherein the computer system further comprises a database server configured to:
   generate the virtual multimedia data;
   incorporate the real-time multimedia data and the virtual multimedia data to generate the hybrid multimedia data; and
   transmit the generated hybrid multimedia data to the mobile electronic device.

3. The system as claimed in claim 1, wherein the mobile electronic device comprises a mobile phone.

4. A system for incorporating captured live event data into one or more virtual environments, comprising:
   a plurality of tracking devices configured to capture real-time events that occur during a plurality of live games to generate real-time multimedia data, the live games being played in respective live environments; and
   a computer system in communication with the tracking devices, the computer system configured to:
   receive the real-time multimedia data from the tracking devices;
   provide virtual multimedia data corresponding to a plurality of virtual environments each comprising one or more aspects corresponding to a live environment;
   combine the real-time multimedia data and the virtual multimedia data to generate hybrid multimedia data, so as to incorporate the captured events into the virtual environments to provide a plurality of hybrid environments for a plurality of hybrid games, wherein the incorporated events in the hybrid environments occur substantially in real-time as the events that occur during the live games;
   transmit the generated hybrid multimedia data to an electronic device; and
   provide a user interface to be displayed on the electronic device for playing the hybrid games, the user interface comprising the hybrid environments, wherein the user interface further comprises an incident notifier configured to trigger a notification when a pre-determined trend of results of at least one of the hybrid games occurs.

5. The system as claimed in claim 4, wherein the tracking devices comprise:
   a digital image capturing device;
   a digital video capturing device;

a card tracker configured to detect an identity of a playing card that is being dealt; and/or a roulette wheel sensor configured to detect a result of a roulette wheel spin.

6. The system as claimed in claim 5, wherein the real-time events comprise:
dealing of the playing card;
the identity of the playing card;
spinning of a roulette wheel; and/or
the result of the roulette wheel spin.

7. The system as claimed in claim 4, wherein the aspects comprise:
at least a portion of a baccarat or roulette game table;
wager(s) placed by a user of the electronic device; and/or
remaining credit belonging to the user of the electronic device.

8. The system as claimed in claim 4, wherein the electronic device comprises:
a mobile electronic device; or
an electronic table game console.

9. The system as claimed in claim 4, wherein the computer system comprises:
a streaming server configured to receive the real-time multimedia data from the tracking devices; and
a game and database server configured to:
provide the virtual multimedia data;
incorporate the real-time multimedia data received from the streaming server into the virtual multimedia data to generate the hybrid multimedia data; and
transmit generated hybrid multimedia data to the electronic device.

10. The system as claimed in claim 9, wherein the game and database server is further configured to generate an Intranet-enabled virtual environment.

11. The system as claimed in claim 4, wherein the user interface comprises an image of a virtual playing card, and wherein a viewing angle of the virtual card is configured to vary to progressively reveal the identity of the virtual playing card.

12. The system as claimed in claim 4, wherein the user interface comprises an enlarged display configured to display at least one of the real-time events.

13. The system as claimed in claim 4, wherein the user interface is configured to concurrently receive a plurality of user inputs for one or more of the hybrid environments.

14. The system as claimed in claim 13, wherein the plurality of user inputs comprise wagers of one or more denominations.

15. The system as claimed in claim 4, wherein the live games comprise:
electronic gaming tables;
electronic table games; and/or
conventional gaming tables.

16. A method of incorporating captured live event data into one or more virtual environments, comprising:
capturing real-time events that occur during a plurality of live games, played in respective live environments to generate real-time multimedia data;
providing virtual multimedia data containing a plurality of virtual environments, each virtual environment comprising one or more aspects corresponding to each live environment;
combining the real-time multimedia data and the virtual multimedia data to generate hybrid multimedia data, so as to incorporate the captured events into the virtual environments to provide a plurality of hybrid environments for a plurality of hybrid games, wherein the incorporated events in the hybrid games occur substantially in real-time as the real-time events;
transmitting the generated hybrid multimedia data to an electronic device; and
providing a user interface to be displayed on the electronic device for playing the hybrid games, wherein the user interface comprises an incident notifier configured to trigger a notification when a pre-determined trend of results of at least one of the hybrid games occurs.

17. The method as claimed in claim 16, further comprising controlling the user interface to concurrently receive a plurality of user inputs for one or more of the hybrid environments.

18. The method as claimed in claim 17, wherein the plurality of user inputs comprise wagers of one or more denominations.

19. The method as claimed in claim 16, further comprising increasing a player capacity of each one of the live games with the use of the virtual environments.

20. An electronic device for processing multimedia data that incorporates captured live event data into one or more virtual environments, comprising:
a display screen;
at least one processor; and
at least one memory including computer program code,
the computer program code configured to, with the at least one processor, cause the electronic device to:
display a user interface on the display screen, the user interface comprising a plurality of hybrid environments for an equal plurality of hybrid games, each hybrid environment comprising a virtual environment with events that occur in a live environment incorporated therein, wherein the incorporated events in the hybrid environment occur substantially in real-time as the events that occur in the live environment; and
receive and process multimedia data associated with the hybrid environments for playing the hybrid games, wherein the user interface comprises an incident notifier configured to trigger a notification when a pre-determined trend of results of at least one of the hybrid games occurs.

21. The electronic device as claimed in claim 20, wherein the plurality of user inputs comprise wagers of one or more denominations.

* * * * *